United States Patent [19]
Ukai et al.

[11] Patent Number: 6,101,506
[45] Date of Patent: Aug. 8, 2000

[54] METHOD AND SYSTEM FOR MANAGING FILES BY VERSION AND PROGRAMS THEREFOR

[75] Inventors: Hiromi Ukai, Sagamihara; Yuichi Yagawa, Yokohama, both of Japan

[73] Assignee: Hitachi, Ltd., Tokyo, Japan

[21] Appl. No.: 09/066,733

[22] Filed: Apr. 27, 1998

[30] Foreign Application Priority Data

May 1, 1997 [JP] Japan .................................. 9-113710

[51] Int. Cl.[7] .................................................. G06F 17/30
[52] U.S. Cl. .......................... 707/203; 707/102; 707/200; 345/133; 345/334; 708/490
[58] Field of Search ............................. 707/203, 3, 200, 707/102; 345/133, 334; 708/490

[56] References Cited

U.S. PATENT DOCUMENTS

| | | | |
|---|---|---|---|
| 5,359,725 | 10/1994 | Garcia et al. .......................... | 395/500 |
| 5,831,617 | 11/1998 | Bhukhanwala .......................... | 345/349 |
| 5,835,601 | 11/1998 | Shimbo et al. .......................... | 380/49 |
| 5,870,725 | 2/1999 | Bellinger et al. .......................... | 705/45 |
| 5,903,889 | 5/1999 | De La Huerga et al. .................. | 707/3 |
| 5,909,689 | 6/1999 | Van Ryzin .............................. | 707/203 |
| 5,943,678 | 8/1999 | Hocker et al. .......................... | 707/511 |

*Primary Examiner*—John E. Breene
*Assistant Examiner*—Cheryl Lewis
*Attorney, Agent, or Firm*—Beall Law Offices

[57] ABSTRACT

A rack 110 is displayed on a display unit 100. A plurality of file cases 112A to 112D are disposed within the rack 110 in an array. A series of files which have a common file name and different versions are all accommodated in one of the file cases 112A to 112D. Files 116A to 116D of the latest version are shown on the file cases 112A, 112B, 112C and 112D with the other files for the older versions being housed within the file cases 112A, 112B, 112C and 112D, respectively.

20 Claims, 25 Drawing Sheets

FIG. 4

| RACK NAME | FILE NAME | VERSION NAME | REMARK | LINK-DESTINATION FILE NAME |
|---|---|---|---|---|
| CATALOGS | HITACHI CATALOG | Vol.5 | | |
| | | Vol.3 | ADDITION OF DISH WASHING MACHINE | HITACHI CATALOG 2 |
| | | Vol.4 | | |
| | | Vol.2 | | |
| | | Vol.1 | | |
| | BB WEAR | SUMMER, 1996 | | |
| DOCUMENT | MANU- FACTURE PLAN | PLAN 6 | | |
| | | PLAN 5 | CHANGE OF SPECIFICATIONS | PRODUCT "xxxx" DOCUMENT |

31 32 33 34 35

30

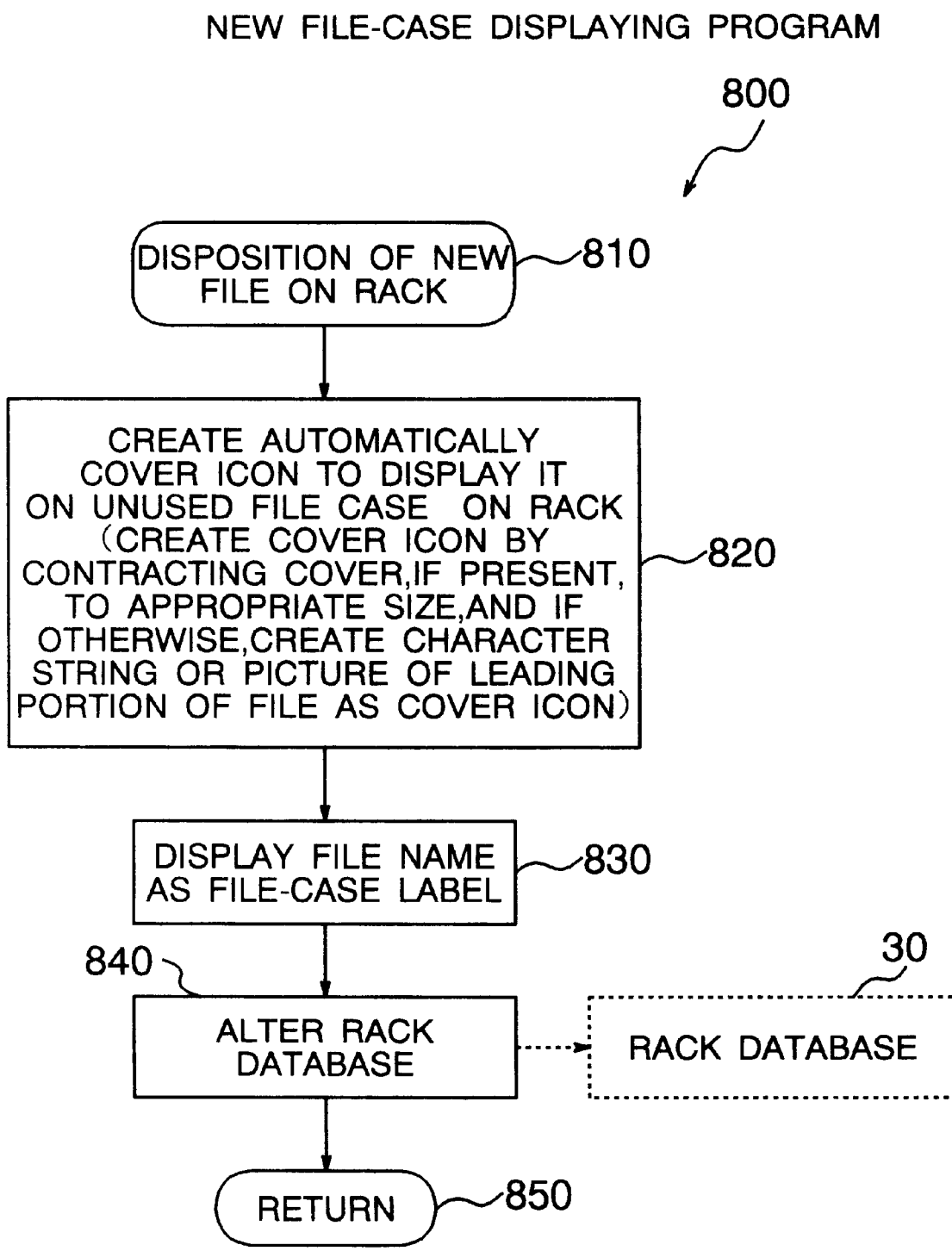

FIG. 11A
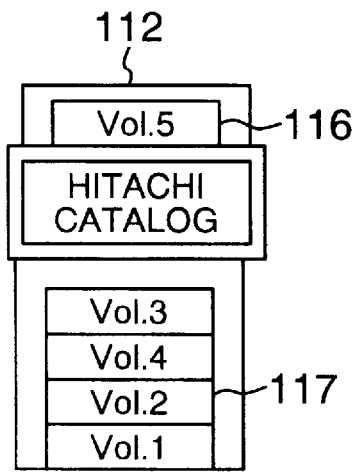
FIG. 11B
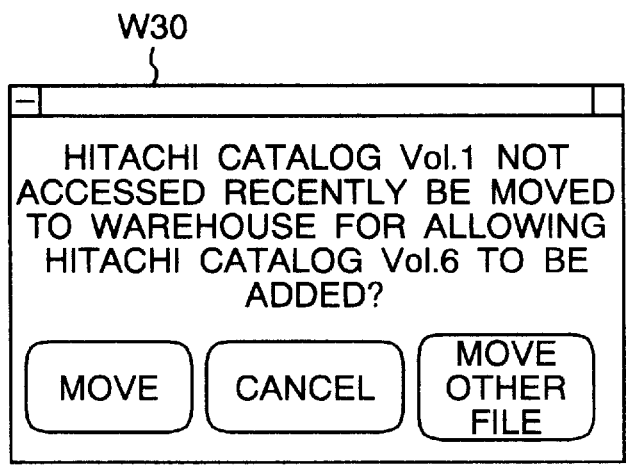
FIG. 11C
| PLEASE SELECT FILE TO BE MOVED TO WAREHOUSE | | OK |
|---|---|---|
| FILE NAME | CREATION/UPDATE DATE | ACCESS DATE |
| HITACHI CATALOG Vol.5 | 1996.6.15,05 : 17pm | 1996.6.21,02 : 22pm |
| HITACHI CATALOG Vol.4 | 1996.6.15,05 : 15pm | 1996.6.21,00 : 59pm |
| HITACHI CATALOG Vol.3 | 1996.1.13,05 : 08pm | 1996.6.21,11 : 27pm |
| HITACHI CATALOG Vol.2 | 1996.4.15,05 : 21pm | 1996.5.18,10 : 43pm |
| HITACHI CATALOG Vol.1 | 1996.3.15,05 : 38pm | 1996.3.31,08 : 06pm |

FILE OPENING PROGRAM

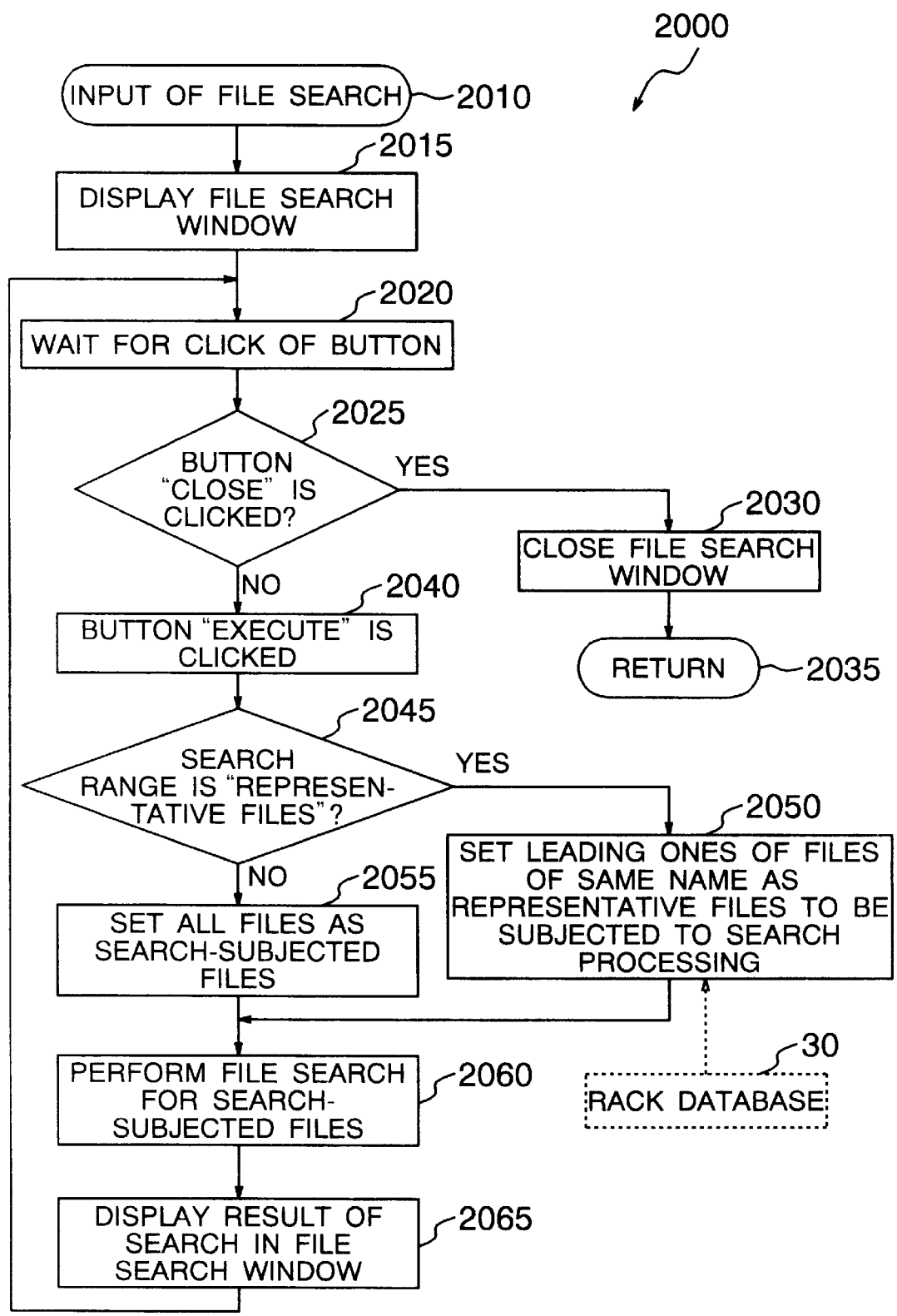

FILE SEARCH ( EXECUTE ) ( CLOSE )

FILE NAME FOR SEARCH : [ CATALOG ] [ INCLUSIVE ▼ ]

SEARCH RANGE : [ ALL FILES ] [ REPRESENTATIVE FILE ]

RACK NAME : [ ▼ ]

CREATION DATA : [ ] / [ ] / [ ] [ BEFORE INC ] [ AFTER INC ]

ACCESS DATA : [ ] / [ ] / [ ] [ BEFORE INC ] [ AFTER INC ]

RESULT OF SEARCH

| FILE NAME | RACK NAME | CREATION DATE | ACCESS DATE |
|---|---|---|---|
| HITACHI CATALOG Vol.5 | CATALOGS | 1996.6.15 | 1996.6.21 |
| H&H CATALOG | CATALOGS | 1996.3.10 | 1996.4.25 |

| FILE NAME | CREATION/UPDATE DATE | ACCESS DATE |
|---|---|---|
| HITACHI CATALOG Vol.6,1995 | 1996.6.15,05 : 17pm | 1996.6.21,02 : 22pm |
| HITACHI CATALOG Vol.5,1995 | 1996.5.15,05 : 15pm | 1996.6.21,00 : 59pm |
| HITACHI CATALOG Vol.4,1995 | 1996.4.13,05 : 21pm | 1996.5.18,10 : 43pm |
| HITACHI CATALOG Vol.3,1995 | 1996.3.15,05 : 38pm | 1996.3.31,08 : 06pm |
| HITACHI CATALOG Vol.2,1995 | 1996.2.15,05 : 44pm | 1996.3.02,09 : 33pm |
| HITACHI CATALOG Vol.1,1995 | 1996.1.15,05 : 08pm | 1996.6.21,11 : 27am |

WAREHOUSE/CATALOG/HITACHI CATALOG

METHOD AND SYSTEM FOR MANAGING FILES BY VERSION AND PROGRAMS THEREFOR

BACKGROUND OF THE INVENTION

The present invention generally relates to a method and a system for managing data files. More specifically, the invention is concerned with a version managing method and a system for carrying out the same which are suited for managing versions of files by individual users by using personal computers at home or the like. Further, the invention is also concerned with programs which can be executed by a computer for carrying out the file managing method.

In recent years, personal computers have become popular and are used not only in offices but also at home. In conjunction with the use of the personal computer at home, there is the conceivable viewing of CD-ROM titles of a magazine-like fashion, CD-ROM catalogs for mail-order sale and the like, acquisition of information of interest by making access to networks, viewing and arrangement or processing of pictures as taken by digital cameras and so forth. Similarly to printed matter such as magazines and catalogs for mail-order sale, most of those publications which can be acquired in the form of electronic media such as CD-ROMs or through networks are issued periodically at predetermined intervals. The electronic publications published periodically are labeled with identifiers such as "Vol." and "No." in accordance with chronographical sequence in which they are issued. For putting in order the pictures taken by a digital camera, the pictures are allocated with serial numbers for making it possible to identify them from one another. Additionally, software for games or for other purposes is labeled with a version number that is renewed every time the function or performance thereof is improved.

In the following description, electronic publications (inclusive of those data derived from printed matter by scanner or the like means), photographs and programs such as game software will be collectively or generally referred to as files. Further, the identifier used for identifying the individual file such as "Vol.", "No.", "Ser." and "Ver. (abbreviation of version)" will be collectively called "version". In this conjunction, it is contemplated that the term "version" also encompasses or includes issue number (e.g. some month, some year) of electronic publication as well as date of issuance thereof.

Heretofore, as a method of managing versions of files by a personal computer, there is known a method of managing the files by classifying them hierarchically by using directories (also known as folders), as is disclosed in U.S. Pat. No. 5,065,347. The structure of a directory is displayed on a display device in the form of a list and can be changed or altered by the user by manipulating the files and the directories (inclusive of child directories, child-child directories and so forth). A similar method is adopted in the desktop metaphor which is currently a main stream of personal computers. Parenthetically, with the desktop metaphor, the top of a desk in an office is simulated. Thus, it is safe to say that the desktop metaphor is suited for use by the personal computer in office.

However, when the directory-based file managing method and the desktop metaphor are adopted in the version management of the files such as electronic publications a personal computer at home, a heavy burden will be imposed on the user because he or she is forced to devise naming of the files and directories as well as structuring or configuring of the directories. This gives rise to a problem that the methodical arrangement of the files by version (e.g. sorting, arraying, sequencing and so forth of the files in consideration of the versions thereof) is not easy.

SUMMARY OF THE INVENTION

In the light of the state of the art described above, it is an object of the present invention to provide a version managing method and system which are capable of arraying/rearranging files easily depending on version (i.e., file management by version).

Another object of the present invention is to provide programs for realizing the version managing method mentioned above.

In view of the above and other objects which will become apparent as the description proceeds, the present invention provides a version managing method and a version managing system structuralized or configured as described below.

A plurality of electronic files (hereinafter also referred to simply as the file) stored in a storage unit are displayed in accordance with the following procedure. The files are classified groupwise, and display areas corresponding to at least the number of groups resulting from the classification are generated, wherein representative images representing the file groups, respectively, are displayed in the display areas, respectively. Each of the representative images is so prepared so as to bear association to the contents of the files belonging to the relevant group. When the representative image is designated or pointed to by a user, a predetermined file in the relevant group is executed. At this juncture, the term "execute" or "execution", is intended to mean that the contents of the electronic file are displayed or a program corresponding to the electronic file is executed. The present invention also provides programs which can be executed by a computer for generating the displays mentioned above. In the version managing system including a processing unit (CPU) according to the present invention, processings mentioned below are executed by the processing unit. Namely, a number of display areas corresponding to the number of groups resulting from groupwise classification of the electronic files are generated on the display unit, wherein the representative images indicating representatively the contents of the files belonging to the groups are displayed in the relevant individual display areas, repetitively.

In conjunction with the groupwise classification of the electronic files, such classification may be adopted that files having a same name and different versions .are included in one group. The versions may include or encompass a plurality of electronic publications labeled with different issue numbers. As the representative images, there may be mentioned (1) representative image indicating a predetermined file in the relevant file group, and (2) representative image indicating a file group as a whole.

The predetermined file (1) may be a file created latest, a file accessed latest by user or a file stored latest in the storage unit. At this juncture, it should be mentioned that there may exist two or more predetermined files. Further, as the content to be indicated by the above-mentioned representative image (1), there may be mentioned a part extracted from the predetermined file (e.g. cover of electronic publication or a part thereof), image created on the basis of the contents of the predetermined file or the like. On the other hand, as the aforementioned representative file (2), there may be mentioned an extracted portion common to the files (e.g. title LOGO of electronic publication). At this juncture, it should be added that designation of the representative image (2) by user results in execution of a predetermined file in the relevant group. Incidentally, the predetermined file may be the same as the one executed when the representative image (1) is designated. Thus, both the representative images (1) and (2) may be displayed, which in turn means that two or more representative images may be provided in association with each of the file groups.

Furthermore, there may be adopted such arrangement that when a display area is designated by a user, images corresponding to other files than the predetermined file in the file group corresponding to the designated display area are displayed in the display area. In that case, the number of the images displayed in the display area in correspondence to the other files than the predetermined file may be limited to a predetermined number, wherein the images of the other files lying outside of the range limited by the predetermined number are displayed when another display area is designated.

Thus, according to a first aspect of the present invention, there is provided a version managing method for managing groups of files of different versions by resorting to a system which includes a storage unit for storing data of groups of files of different versions, a display unit, and an arithmetic processing unit for performing processings by using the data stored in the storage unit to thereby generate displays on the display unit, which method includes a step of displaying on the display unit a rack including a plurality of file cases, and a step of processing the plural file cases on the presumption that each of the file cases stores a series of files having a same file name and differing in respect to versions. By way of example, when a given one of the file cases is designated by user, a series of files belonging to the given file case are displayed. Parenthetically, it should be mentioned that such terms as "case", "door", "knob", "rack", "warehouse" and the like used in the description which follows are only words of convenience and are not to be construed as limiting terms. To say in another way, the functions of the components expressed by the above terms may be expressed otherwise without departing from the spirit and scope of the present invention.

With the version managing method described above, file version management and rearrangement can be much simplified and facilitated, to an advantage.

In a preferred implementation mode for carrying out the version managing method according to the first aspect of the invention described above, images representing a series of file groups may be displayed on the aforementioned file case.

In a second preferred implementation mode for carrying out the version managing method according to the first aspect of the invention, a file created latest may be displayed on the relevant file case with files for back numbers (i.e., other files than that created latest) being housed interiorly in the file case.

By virtue of the version managing method described just above, the version of the file can be handled intuitively, which in turn contributes to mitigation of the burden imposed on the user in the version management.

In a third preferred implementation mode for carrying out the version managing method according to the first aspect of the invention, a file accessed latest may be displayed on the relevant file case with files for back numbers being housed interiorly in the file case.

With the version managing method mentioned above, the file used latest can easily be accessed because the file accessed latest is displayed topmost.

In a fourth mode for carrying out the invention, it is proposed in combination with the second and third implementation mode to display contracted images of files housed within the file case on the file case as icons of the files. Of course, the position for displaying the icon is not limited to a location on the file case. To say in another way, the icon may be displayed at a desired location on the display so long as association between the icon and the relevant file can be understood. Same holds true for the implementation modes described above.

By virtue of the arrangement described just above, browsability of the files can be much enhanced because the contents of the files can be understood at one sight from the images of the icons.

In conjunction with the second, third or fourth implementation mode described above, it is preferred to display the files housed within the file case in a sequential array, starting from the one newest in respect to the date of access.

With the arrangement mentioned above, the visual confirmability of the files accessed recently can be enhanced because the order in which the files have been accessed can be understood easily from the order in which the files are displayed.

In conjunction with the first aspect of the invention described previously, it is preferred to migrate the files to a warehouse provided separately from the file case when the number of the files which can be accommodated with the file case exceeds a predetermined number.

Parenthetically, with the term "warehouse", it is contemplated to mean a display area differing from the display area for the file case.

By virtue of the arrangement mentioned above, the burden imposed on user in the file management can be significantly mitigated because the files in excess are automatically migrated to the warehouse.

In conjunction with the implementation mode described just above, it is preferred to select the files to be migrated to the warehouse in a sequential order, starting from the oldest one in respect to the access date.

With the arrangement described above, those files having high probability of use are left within the file case while those of low probability of use are housed within the warehouse. Thus, the access to the files can be much facilitated.

In conjunction with the aspect of the invention, one or combination of the implementation modes described above, it is preferred that when a file search is preformed, files corresponding to the representative images are subjected to search processing.

Due to the arrangement described just above, the time taken for the search can be shortened when compared with the file search where all the files are accessed. Besides, such situation that files of similar names make appearance in the result of the search can be avoided, thus making it easy to find out a file of concern.

In conjunction with the aspect of the invention or one or combinations of the implementation modes described above, it is preferred to adopt such arrangement that opening of a file can be realized by moving that file to a predetermined area on the display. By way of example, a viewing icon may be displayed and a file to be opened may be moved onto the viewing icon by drag and the drop with a mouse.

Due to the arrangement mentioned just above, the file can be opened without difficulty even by the user who is not accustomed to open the file with double click operation.

These and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 4 is a view for illustrating a data structure of a rack database employed in the version managing system for realizing the version managing method according to an embodiment of the invention;

FIG. 8 is a flow chart for illustrating the contents of processing executed by a new file-case creating program employed in the version managing method according to an embodiment of the invention;

FIGS. 11A, 11B and 11C are views showing a file case and windows for illustrating the contents of processing executed by the latest version file adding program used in the version managing method according to an embodiment of the invention;

FIG. 20 is a flow chart for illustrating the contents of processings executed by a file search program employed in the version managing method according to an embodiment of the invention;

FIG. 21 is a view showing a file search window generated on a display screen for illustrating the contents of processings executed by the file search program used in the version managing method according to an embodiment of the invention;

DESCRIPTION OF THE PREFERRED EMBODIMENTS

Figure 1:
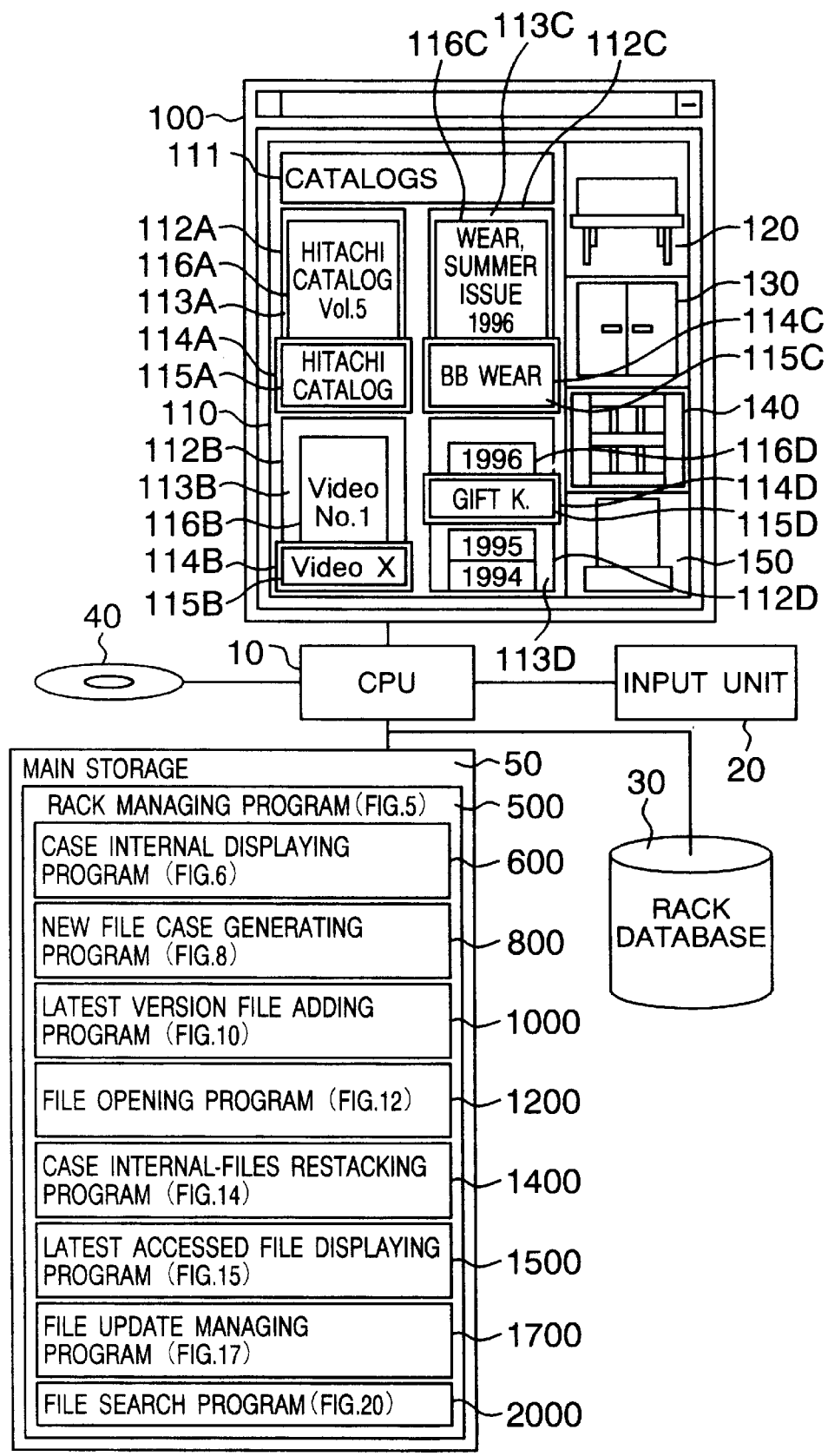
FIG. 1 is a block diagram showing generally and schematically a system configuration of a version managing system for realizing a version managing method according to an embodiment of the present invention.

The present invention will be described in detail in conjunction with what is presently considered as preferred or typical embodiments thereof by reference to the drawings. In the following description, like reference characters designate like or corresponding parts throughout the several views.

Now, a version managing method according to an embodiment of the present invention will be described by reference to FIGS. 1 to 23.

At first, referring to FIG. 1, description will be directed to a configuration of a version managing system for carrying out the version managing method according to the invention.

FIG. 1 is a block diagram showing generally and schematically an arrangement of the version managing system for realizing the version managing method according to an embodiment of the invention.

The version managing system according to the instant embodiment of the invention is comprised of a CPU (central processing unit) 10, an input unit 20, a rack database 30, a CD-ROM (compact-disk read-only memory) 40, a main storage 50 and a display unit 100. The main storage 50 stores therein a rack managing program 500, details of which will be elucidated later on by reference to FIG. 5. At this juncture, it should however be mentioned that the rack managing program 500 includes a file-case internals displaying program 600, a new file-case creating program 800, a new or latest version file adding program 1000, a file opening program 1200, a case internal files restacking program 1400, a latest accessed file displaying program 1500, a file update managing program 1700 and a file search program 2000, details of which will be explained later on by reference to FIG. 6, FIG. 8, FIG. 10, FIG. 12, FIG. 14, FIG. 15, FIG. 17 and FIG. 20, respectively.

Turning back to FIG. 1, there is shown an example of display image generated on a display screen of the display unit 100. On the display screen of the display unit 100, there is generated an image of a rack 110 in a region extending from the center to the left-hand side, as viewed in FIG. 1. The rack 110 is made use of for managing a plurality of files by arranging or rearranging them. Displayed on the screen of the display unit 100 at the right-hand side is a group of tools (hereinafter referred to also as the tool group) which includes a viewing room 120, a warehouse 130, a rack houseroom 140 and a case houseroom 150. The individual tools are used for managing the files. Details of these tools will also be explained later on.

Description will now turn to the internal structure of the rack 110. Metaphorically, with the term "rack", as exemplified by the rack 110, it is intended to simulate a rack used actually for accommodating so-called catalogs in the everyday life. Displayed at a top portion of the rack 110 is a rack identifying name (hereinafter referred to as the rack name) 111 for identifying the rack 110. In the case of the example illustrated in the drawings, the rack name "catalogs" is labeled, which means that the rack 110 is destined for use in rearranging files allocated to catalogs. At this juncture, it should be added that a plurality of racks such as typified by the rack 110 may be provided for putting in order or arranging properly other files except for the catalog files, as will be described hereinafter by referring to FIG. 2 or FIG. 3.

Furthermore, displayed within the rack 110 are file cases 112A, 112B, 112C and 112D which are provided with file-case doors 113A, 113B, 113C and 113D as well file-case knobs 114A, 114B, 114C and 114D, respectively. It should be understood that each of the file cases 112A, 112B, 112C and 112D accommodates or stores therein a series of files (also referred to as the file group).

Figure 26A:
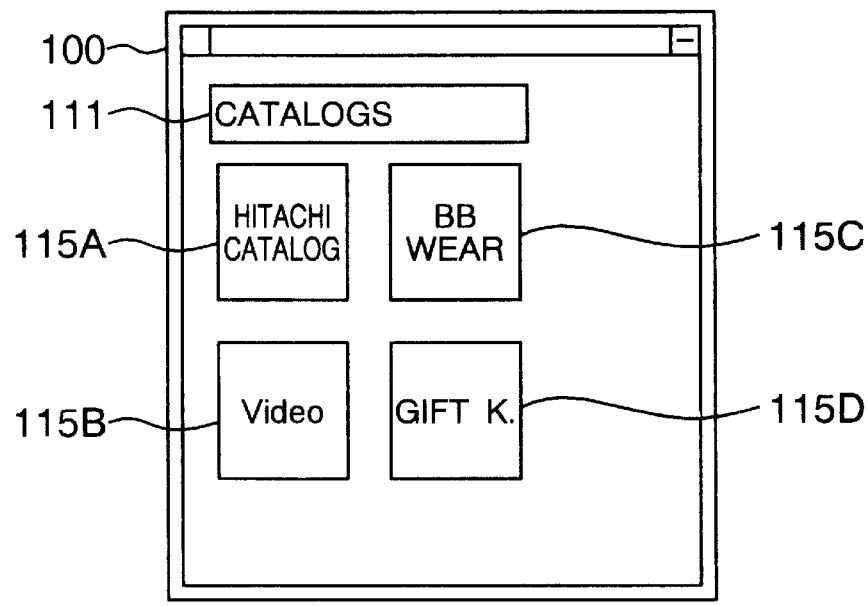
FIG. 26A is a view showing a first modification of display format according to the invention.

The file-case knobs 114A, 114B, 114C and 114D are labeled with file case identifying names (hereinafter referred to as the file-case names) 115A, 115B, 115C and 115D, respectively. In the case of the illustrated example, the file-case name 115A is expressed as "Hitachi Catalog". This means that the files which can be stored or accommodated within the file case 112A have the name or identifier "Hitachi Catalog". Incidentally, the file-case name may be indicated by a representative image instead of allocating the file name. In that case, displays 116A to 116D mentioned below may be omitted, as can be seen in FIG. 26A. In this conjunction, such arrangement should preferably be adopted that when any one of the file-case names 115A to 115D is designated, the corresponding one of the files having the case names 115A to 115D is executed.

Figure 26B:
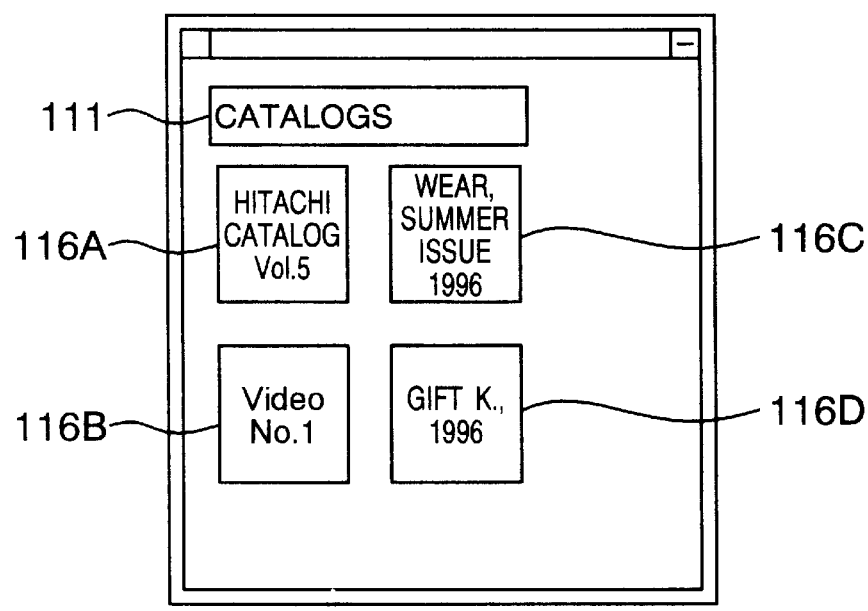
FIG. 26B is a view showing a second modification of display format according to the invention.

The file-case doors 113A, 113B, 113C and 113D are made use of for storing the new or latest files (files of the latest version) 116A, 116B, 116C and 116D of the files housed within the file cases 112A, 112B, 112C and 112D, respectively. In the case of the illustrated example, it is shown that the file-case door 113A stores the latest file (file of the latest version) "Hitachi Catalog Vol. 5" among the files "Hitachi Catalog". Parenthetically, the latest files 116A, 116B, 116C and 116D may be displayed in the form of contracted graphics indicating covers or titles of the relevant files, respectively. By virtue of such arrangement, the contents of the individual files can be recognized at sight. In the case of the instant embodiment of the invention, each of the latest files (i.e., files of the latest version) 116A to 116D is selected as the representative image. In that case, display of the file-case names 115A to 115D may be omitted, as can be seen in FIG. 26B. of course, both the file-case names 115A to 115D and the latest files 116A to 116D may be selected as the representative images.

The files for the back numbers except one for the latest file are stored internally within the file cases 112A, 112B, 112C and 112D. Namely, the latest files are stored in the file-case doors 113A, 113B, 113C and 113D of the file cases 112A, 112B, 112C and 112D while the files for the back numbers are stored internally within the cases 112A, 112B, 112C and 112D.

The file-case knobs 114A, 114B, 114C and 114D are made use of for opening the file cases 112A, 112B, 112C and 112D to view the files for the back numbers which are accommodated therein. Further, by dragging and scrolling upwardly any one of the file-case knobs 114A, 114B, 114C and 114D with the mouse, the corresponding one of the file cases 112A, 112B, 112C and 112D can be opened.

Parenthetically, the file case 112D labeled "Gift K" is shown in the opened state in which the file-case knob 114D as been scrolled upwardly. In this state, it can be seen hat the back number files "1995" and "1994" except for the latest file "1996" are housed within the file case 112D.

In the state shown in FIG. 1, four file cases 112A, 112B, 112C and 112D are disposed within one rack 110. However, in the version managing system now under consideration, it is assumed that six file cases are present within the rack 110, as will be described hereinafter by reference to FIG. 2. Ordinarily, the six file cases can be displayed by displaying the viewing room 120, the warehouse 130, the rack houseroom 140 and the case houseroom 150 belonging to the tool group in the form of icons of a small size at a lower right location on the display screen.

The CD-ROM 40 is often used as a medium carrying catalog files. Accordingly, the CD-ROM 40 is shown as being connected to the version managing system now under consideration. It should however be understood that the CD-ROM 40 is not indispensably required for carrying out the present invention.

Ordinarily, many of the electronic publications such as electronic catalogs, magazine and the like remain yet to be accessed except for the latest one. As a result, the back numbers thereof tend to increase unwittingly, making it difficult to find out or search the desired one at sight. In addition, troublesome procedure is involved in putting in order or arranging properly these accumulated back numbers. By contrast, in the version managing system according to the instant embodiment of the invention, rearrangement of the files can be much facilitated because a series of files are stored in the associated file cases, respectively, which are disposed in or on the rack.

Additionally, in the version managing system now under consideration, the latest file of each file group corresponding to each file series is placed at the file-case door on the file case as the representative of the file group. Owing to this feature, contents of the files can be easily confirmed. More specifically, even when only the file-case names 115A, 115B, 115C and 115D indicating the file name are displayed, the species of the files stored in the respective file cases can be determined roughly. However, because of lack of concreteness, it is usually impossible to confirm intuitively the contents of the files. On the other hand, in the version managing system now under consideration, the visual confirmability of the files can be enhanced owing to the feature that the latest file is displayed on the file case.

Besides, because a plurality of file cases are displayed within the rack, browsability of the files placed orderly in the rack can be ameliorated.

Although the back numbers of the file group (file series) are accommodated internally within the associated file case, it is possible to confirm the contents of these files by scrolling the case knob.

For housing or storing a file in a file case, the file name 32 and the version name 33 of the file are visually checked to thereby store the file in the file case in which a file or files of the same file name have been housed. The processing required to this end may be executed by the version managing system upon storage of the file in the rack database 30 or alternatively realized by inputting the file name and the version identifier or name by an operator or user. When the file name 32 and the version name 33 to be checked by the version managing system are those of the file for the electronic publication, the title thereof as found on the cover or other location may be utilized as the file name.

On the other hand, when the file labeled with a same file name as that to be newly stored is absent in the rack database 30, a file case may be newly created in accordance with procedure illustrated in a flow chart of FIG. 8. Furthermore, in case the same file name and the same version name exist in the rack database 30, processing for excluding the relevant file from storage in the rack database 30 may be executed. The processing to this end can easily be realized by issuing to user an alarm indicating that the identical file has already been present.

Figure 2:
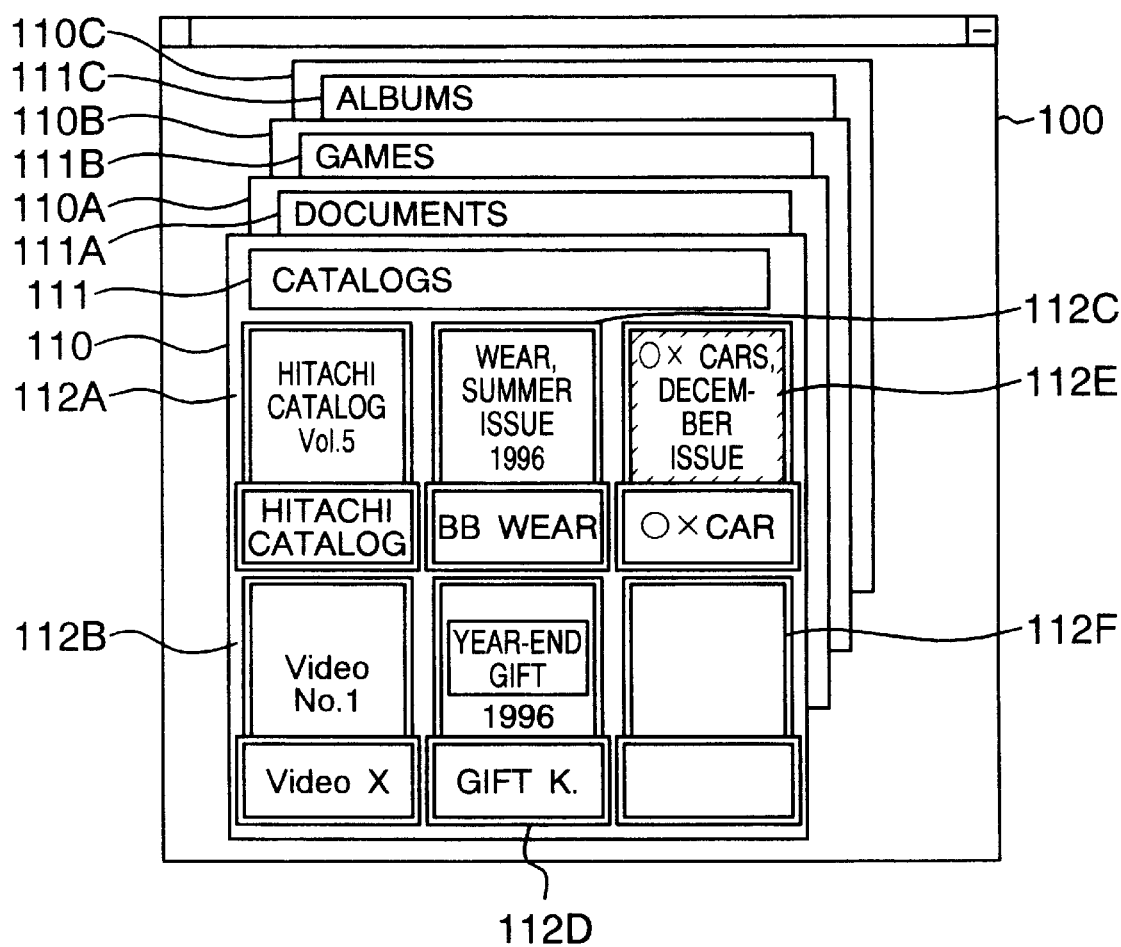
FIG. 2 is a view for illustrating a first example of rack generated on a display screen of the version managing system for carrying out the version managing method according to an exemplary embodiment of the present invention.
Figure 3:
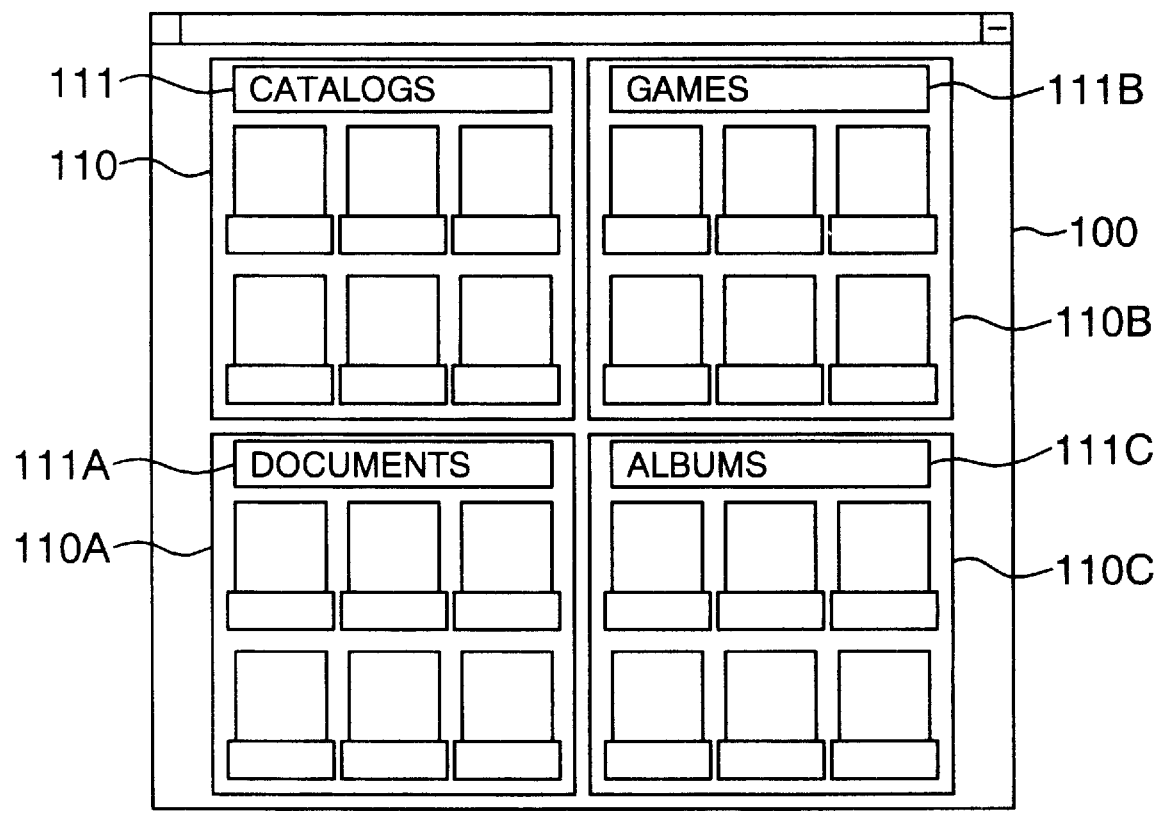
FIG. 3 is a view illustrating a second example of the rack generated on a display of the version managing system for carrying out the version managing method according to an exemplary embodiment of the present invention.

Next, description will be directed to exemplary displays of plural racks generated on the display unit 100 by referring to FIGS. 2 and 3.

FIG. 2 is a view for illustrating first examples of racks generated on the display screen of the version managing system for carrying out the version managing method according to an embodiment of the present invention, and FIG. 3 is a view illustrating second examples of the same.

The personal computer for home use can find utilization for various works such as reading of catalogs and magazines and sorting and rearrangement of documents, viewing, sorting and rearrangement of games and electronic photographs taken by digital cameras, creation of New Year's cards and so forth. To this end, it will be convenient to classify groupwise the files on a use-by-use basis. For this reason, in the version managing system according to the instant embodiment of the invention, a plurality of racks are made usable, wherein a group of files classified in dependence on the destined use is placed in each of the racks and the name of the group is affixed to the relevant rack.

Figure 24:
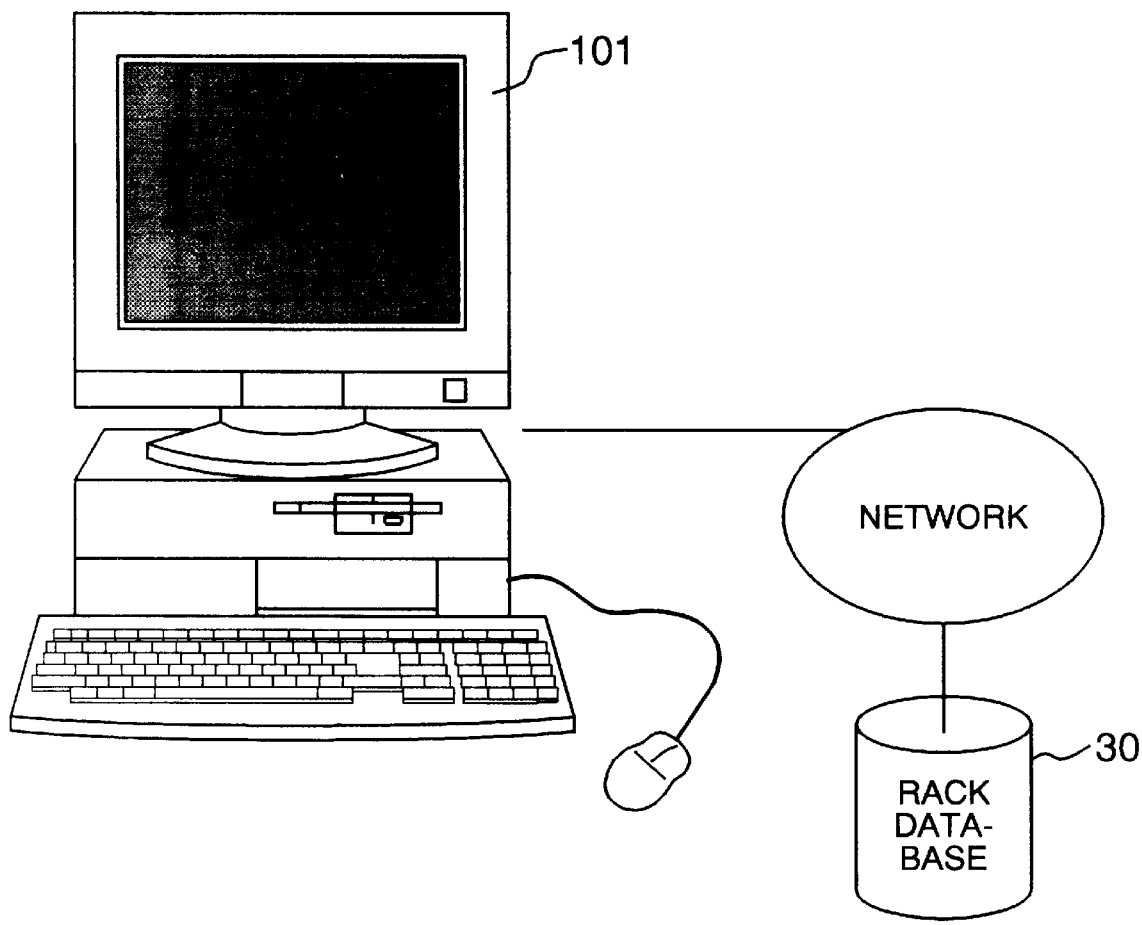
FIG. 24 is a view showing only schematically a configuration of a version managing system in which a computer and a rack database are interconnected by way of a network.
Figure 25:
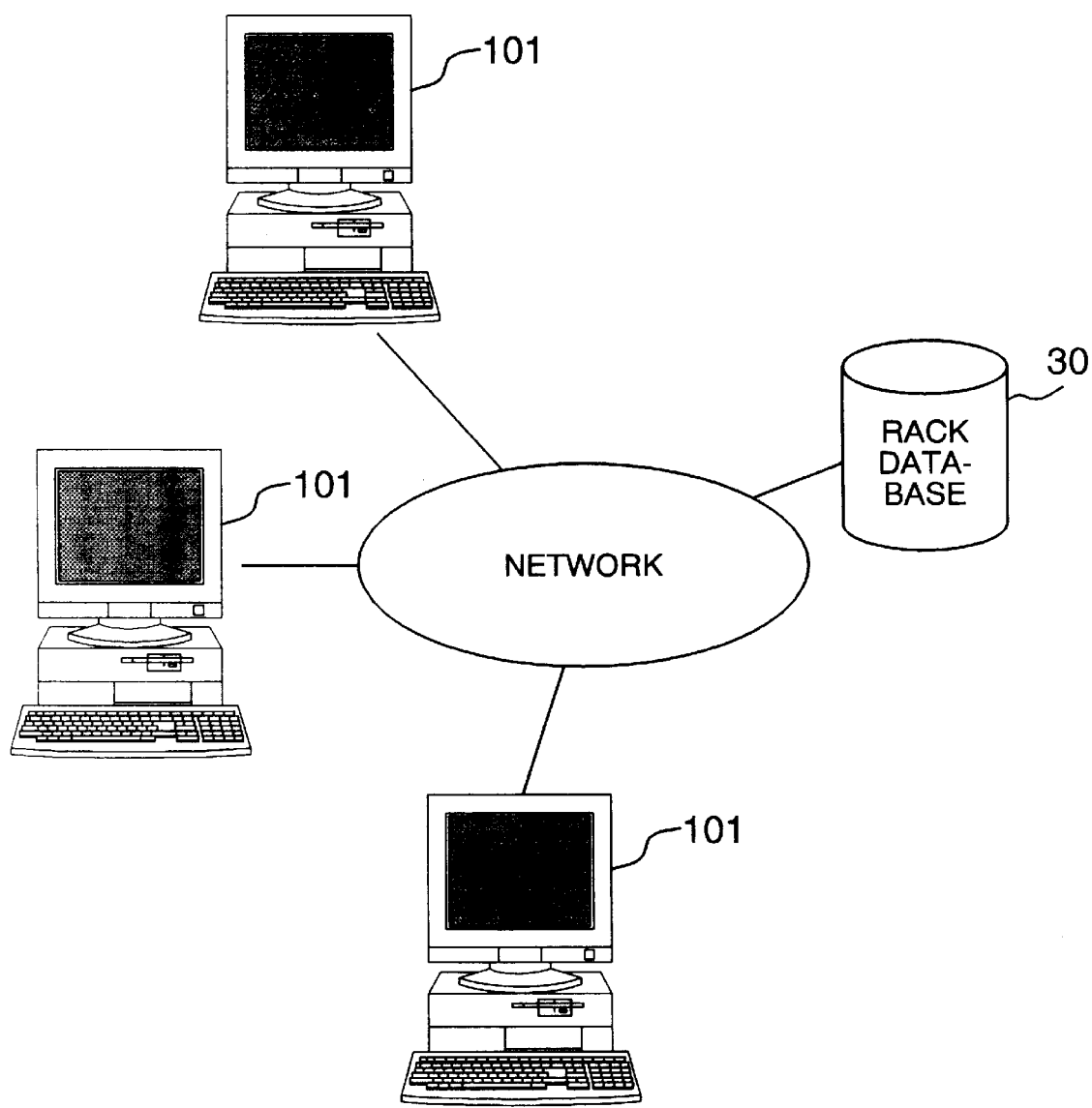
FIG. 25 is a view showing only schematically a configuration of a version managing system in which a plurality of computers are connected to a rack database by way of a network.

Incidentally, in conjunction with the system shown in FIG. 1, it has been described that the CPU 10, the input unit 20, the rack database 30, the CD-ROM 40, the main storage 50 and the display unit 100 are implemented as one integral set. However, the invention is never limited to such structure. To say in another way, the components such as the CPU 10, the input unit 20, the rack database 30, the CD-ROM 40, the main storage 50 and the display unit 100 may be disposed at locations physically distanced from one another and interconnected through a network. By way of example, the rack database 30 may be implemented as a separate unit (managed by other person different from the user of the version managing system) and a computer 101 implemented in other configuration may be connected to the separated rack database 30 by way of a network, as is illustrated in FIG. 24. Further, the computer 101 may be connected to a plurality of rack databases. Besides, such arrangement may equally be adopted that a plurality of computers 101 may make access to the rack database 30, as is illustrated in FIG. 25. Further, each of the computers 101 may be so connected as to be capable of accessing a plurality of rack databases.

It should further be added that in the system shown in FIG. 1, the rack managing program is stored in the main storage 50. However, the rack managing program may be stored in a storage medium such as FD (floppy disk), CD-ROM, hard disk, DVD (digital video disk) or the like. Alternatively, the system may be so arranged that the main storage 50 can be delivered through the medium of network.

In the case of the example illustrated in FIG. 2, a plurality of racks are displayed in stack or superposition. More specifically, a plurality of racks 110, 110A, 110B and 110C are displayed in stack on the display unit 100. At top portions of the racks 110, 110A, 110B and 110C, there are displayed rack names 111, 111A, 111B and 111C indicating the identifiers or names of the racks, respectively. In the case of the example illustrated, "catalogs", "documents", "games" and "albums" are shown as the rack names 111, 111A, 111B and 111C, respectively, indicating that these racks are employed for putting in order or rearranging file groups for the catalogs, documents, games and albums, respectively. In the case of the example illustrated, the rack 110 for the catalog species is displayed in front. Of course, it is possible to display any desired one of the rack names 111, 111A, 111B and 111C in front by clicking it with the mouse.

Further, displayed within the rack 110 are six file cases 112A, 112B, 112C, 112D, 112E and 112F, of which the file case 112F is an empty file case having nothing stored therein.

In the case of the example illustrated in FIG. 3, a plurality of racks are displayed in stack or superposition. More specifically, a plurality of racks 110, 110A, 110B and 110C are displayed in stack on the display unit 100. At top portions of the racks 110, 110A, 110B and 110C, there are displayed the rack names 111, 111A, 111B and 111C indicating the identifiers or names of the racks, respectively.

When a given one of the file cases is to be displayed in a large size, a display format shown in FIG. 2 may be employed, while when the number of the file cases capable of being displayed, a display format shown in FIG. 3 may be adopted.

Now referring to FIG. 4, data structure of the rack database 30 will be described.

FIG. 4 is a view for illustrating a data structure of the rack database employed in the version managing system for realizing the version managing method according to the instant embodiment of the invention.

The rack database 30 bears correspondence to the exemplary rack display shown in FIG. 1 or FIG. 2 and is composed of items such as a rack name 31, a file name 32, a version name 33, a remark column 34 and a link-destination file name 35.

The rack name 31 includes a plurality of file names 32. By way of example, the rack name 31 identifying "Catalogs" contains a plurality of file names 32 such as "Hitachi Catalog", "BB Wear", etc. The file name 32 is displayed on the display unit 100 as the file case name 115 shown in FIG. 1.

The file name 32 contains a plurality of version names 33. By way of example, the file name 32 corresponding to "Hitachi Catalog" contains a plurality of version names 33 exemplified by "Vol. 5", "Vol. 3", "Vol. 4", "Vol. 2" and "Vol. 1". The leading one of the files of the plural version names 33 covered by the same file name 32 represents the version name of the latest file, while the succeeding file represents the one having the latest accessed date of the files having the same file name except for the latest file mentioned above with the next succeeding file representing the one having the second latest accessed date and so forth. In the case of the illustrated example, the file "Vol. 5" is the latest one, the file "Vol. 3" is the file accessed latest and the file "Vol. 4" is the file accessed immediately in precedence to the file "Vol. 3".

The remark column 34 contains data concerning the content of the file. The remark column 34 is adapted for use for specifying difference in the contents among the files of different versions and headline of magazine or the like. By way of example, "Addition of Dish Washing Machine" entered in the remark column 34 represents a typical one of the headline of magazine, while "Change of Specifications" represents difference in the contents of file.

The link-destination file names 35 indicate inter-file relations when another series of files is derived from a given series of files. By way of example, a plurality of files can be created on the basis of a given document file. However, interrelationship between these files can not be managed only with the aid of the version. In the case of the illustrated example, it is shown that the link-destination file name for the file labeled the file name "Hitachi Catalog" and the version name "Vol. 3" is "Hitachi Catalog 2", which means that a series of files having the file name "Hitachi Catalog 2" are derived from "Hitachi Catalog, Vol. 3".

Figure 5:
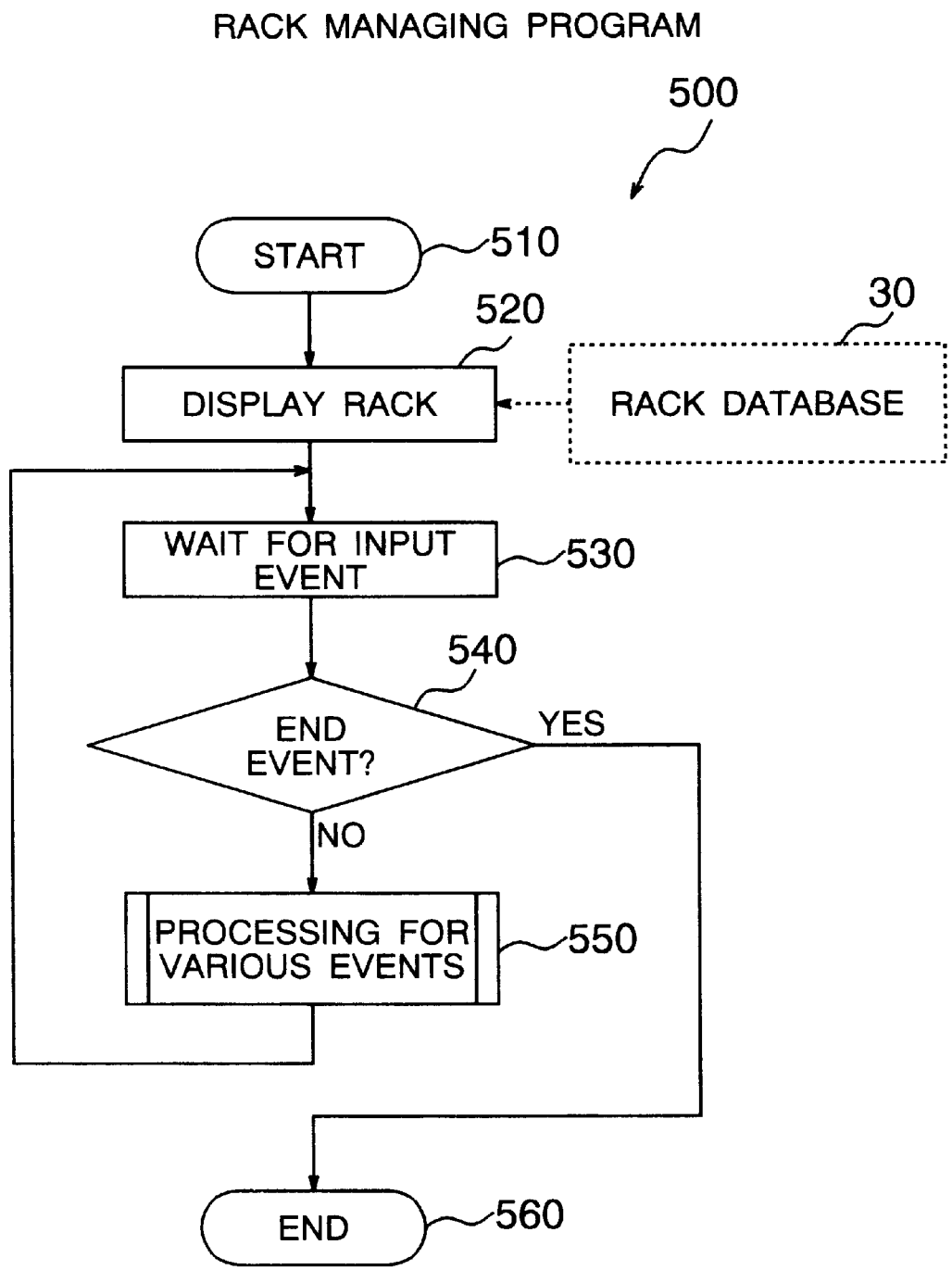
FIG. 5 is a flow chart for illustrating the contents of processings executed by a rack managing program employed in the version managing method according to an embodiment of the invention.

Next, referring to FIG. 5, description will be directed to the contents of the processings executed by the rack managing program 500 shown in FIG. 1.

FIG. 5 is a flow chart for illustrating the contents of processings executed by the rack managing program employed in the version managing method according to the instant embodiment of the invention, In a step 510, the rack managing program 500 is activated, which is then followed by a step 520 in which the CPU 10 displays the rack 110 on the screen of the display unit 100 by making reference to the rack database 30. Subsequently, in a step 530, occurrence of event in response to user's manipulation of the input unit 20 is waited for.

In a step 540, decision is made as to whether or not the event as occurred is an end event. When the step 540 results in affirmation (YES), the program is then terminated in a step 560.

On the other hand, unless the event as occurred is the end event, the processing being executed branches to a program 600, 800, 1000, 1200, 1400, 1500, 1700 or 2000 in correspondence to the event really occurred. Concerning the processings of the programs 600, 800, 1000, 1200, 1400, 1500, 1700 and 2000, description will be made later on.

Next, referring to FIG. 6 and FIGS. 7A, 7B and 7C, description will turn the contents of the processings executed by the file-case internals displaying program 600 shown in FIG. 1.

Figure 6:
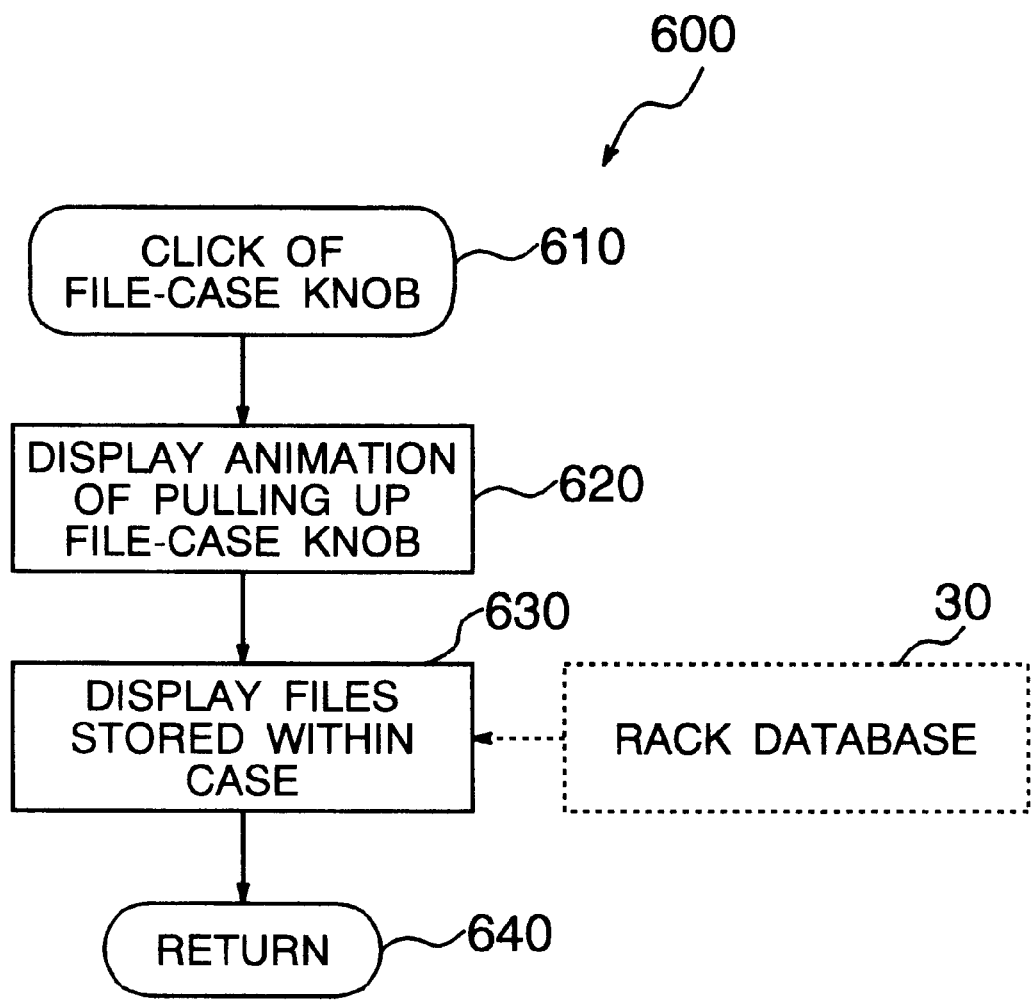
FIG. 6 is a flow chart for illustrating contents of processings executed by a case internals displaying program employed in the version managing method according to an embodiment of the invention.
Figure 7A:
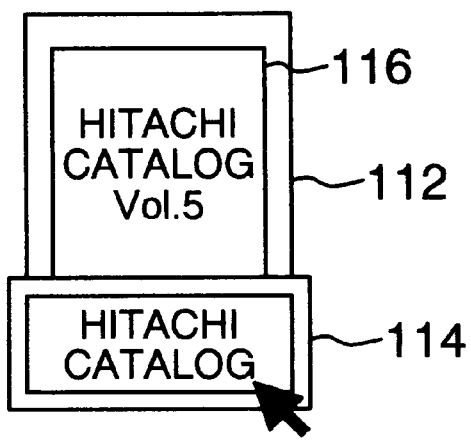
FIGS. 7A, 7B and 7C are views showing file cases generated on a display screen for illustrating the contents of processings executed by a case internals displaying program used in the version managing method according to an embodiment of the present invention.
Figure 7B:
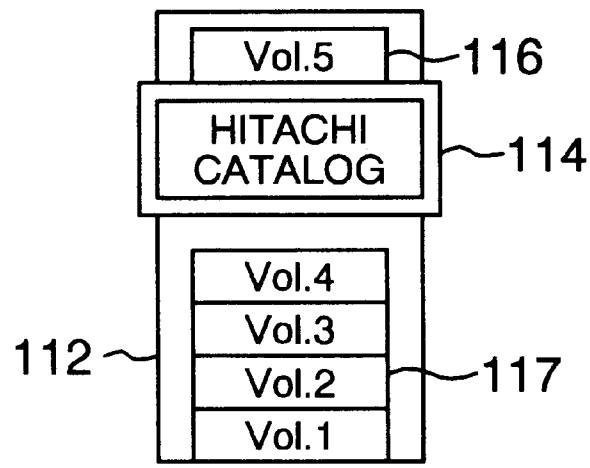
Figure 7C:
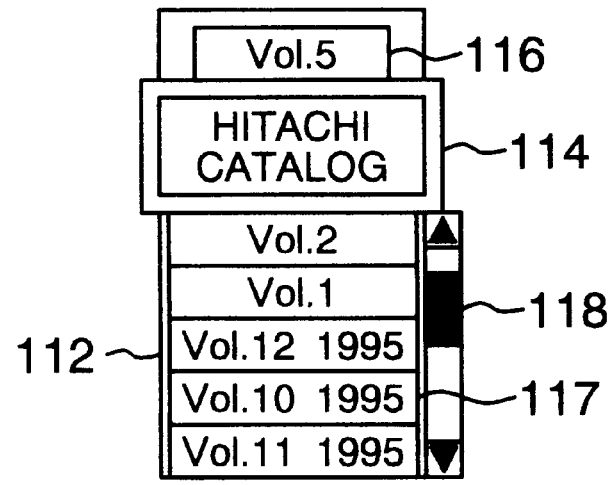

FIG. 6 is a flow chart for illustrating the contents of processings executed by the file-case internals displaying program employed in the version managing method according to the instant embodiment of the invention, and FIGS. 7A, 7B and 7C are views showing file cases generated on the display screen for illustrating the contents of processings executed by the file-case internals displaying program used in the version managing method according to the instant embodiment of the invention.

First referring to FIG. 7A, when the user clicks the file-case knob 114 of the file case 112 with the mouse, the CPU 10 activates the file-case internals displaying program 600 in a step 610 shown in FIG. 6.

When the mouse is moved upwardly after the activation of the file-case internals displaying program 600, an animation of pulling upwardly the file-case knob 114 is displayed, as is illustrated in FIG. 7B, whereon the file-case door 113 is opened.

Subsequently, in a step 630, the CPU 10 reads out the names of the files stored within the case as well as the sequential order in which the files are stacked by making reference to the rack database 30, whereon the files are displayed within the file case 112 in the sequential order as read out, as can be seen in FIG. 7B. A file group 117 for the back numbers is displayed within the file case 112. Parenthetically, in the state where the file case 112 is closed as shown in FIG. 7A, the latest file (file of the latest version) 116 is displayed in the form of a contracted graphic representing the cover. By contrast, in the state where the file case 112 is opened as shown in FIG. 7B, the version name is displayed. At this juncture, it should be mentioned that display may be limited to only the version name when the file case is in the open state.

When the number of the files belonging to the file group 117 for the back numbers increases excessively, it becomes impossible to display all the files at one time within the area of the file case 112. To cope with such situation, a scroll bar 118 is provided for allowing the files belonging to the file group 117 for the back numbers to be displayed sequentially by moving the scroll bar, as is illustrated in FIG. 17C.

Finally, upon termination of the file display in the step 630, the rack managing program 500 shown in FIG. 5 is resumed in a step 640.

Next, referring to FIG. 8 and FIGS. 9A, 9B and 9C, description will be made of the contents of the processings executed by the new file-case creating program 800 shown in FIG. 1.

Figure 9A:
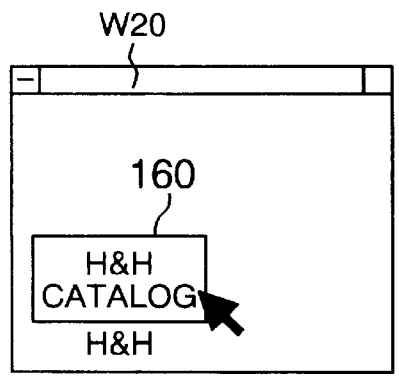
FIGS. 9A, 9B and 9C are views showing windows generated on a display screen for illustrating the contents of processings executed by the new file-case creating program used in the version managing method according to an embodiment of the invention.
Figure 9B:
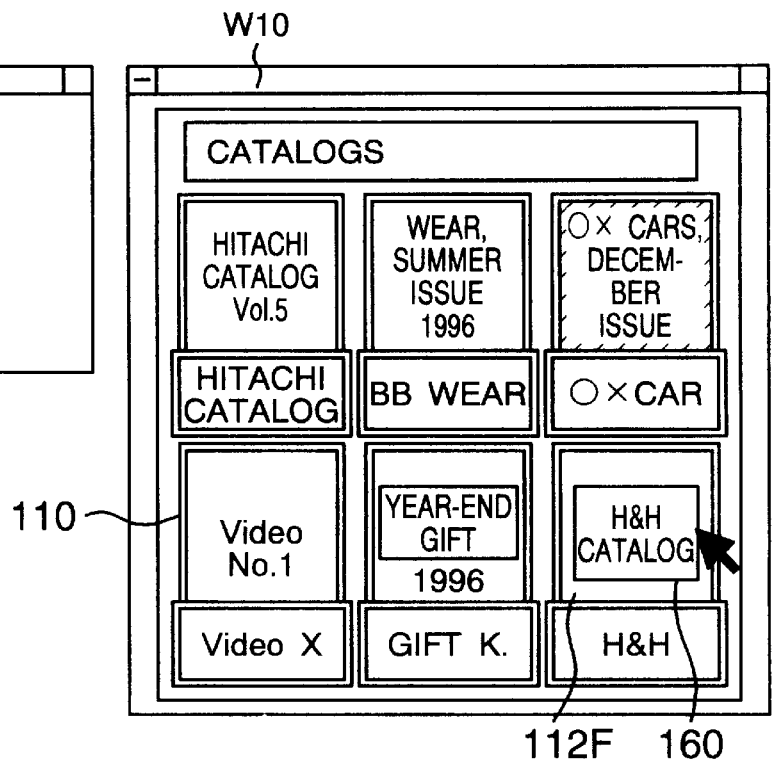
Figure 9C:
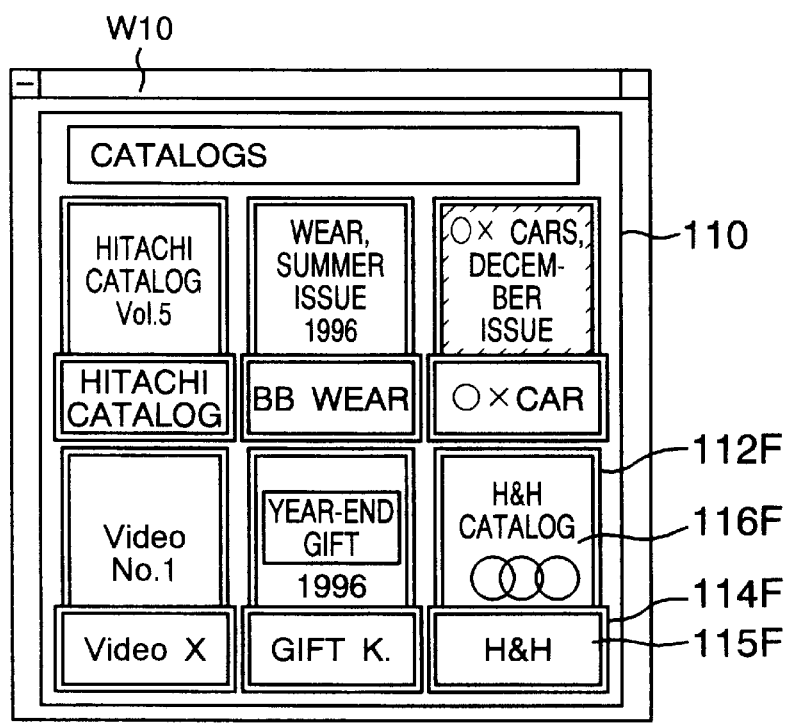

FIG. 8 is a flow chart for illustrating the contents of processings executed by the new file-case creating program employed in the version managing method according to the instant embodiment of the invention, and FIGS. 9A, 9B and 9C are views showing windows generated on the display screen for illustrating the contents of processings of the new file-case creating program used in the version managing method according to the instant embodiment of the invention.

Although the rack can be used as the file managing system dedicated to a particular computer, it is presumed, only for the purpose of illustration, that the rack is used in association with the window system which is the mainstream of operating system at present. Now, let's assume a new catalog has been installed in a personal computer as one application. Then, there is created a new window W20 on the screen of the display unit 100, as shown in FIG. 4, wherein an icon 160 of the new file is displayed within the window W20. In the case of the illustrated example, the icon 160 of the new file "H & H Catalog" is displayed. Needless to say, this "H & H Catalog" can be viewed by clicking the icon 160 of the new file with the aid of the mouse or the like.

On the other hand, for creating an unused file case 112F within the rack window W1O, the case houseroom 150 shown in FIG. 1 is clicked with the mouse. The file case created within the case houseroom 150 can be disposed on the rack 110 within the rack window W10 by dragging it with the mouse.

After completion of the preparatory processing described above, the icon 160 of the new file is dragged into the rack window W10 with the mouse to place it on the unused file case 112F. The CPU 10 responds thereto by activating the new file-case creating program 800 in a step 810.

Subsequently, in a step 820, the CPU 10 creates automatically a cover icon of the file to display the cover icon on the unused file case on the rack. In other words, the CPU 10 creates the cover icon by using a graphic corresponding to the contracted cover image of the latest file when the file to be registered has a cover. On the other hand, unless the file for registration has no cover, the CPU 10 creates the contracted image by using a graphic representing the file of concern or by cutting out and contracting, as occasion requires, a character string or a picture from a leading portion of the file. A cover icon 116F as created is displayed on the unused file case 112F, as can be seen in FIG. 9C.

Next, in a step 830, the file name "H & H" is displayed at the file-case knob 114F as the file-case name (label) 115F of the unused file case 112F.

In succession, the new file rack is added to the rack database 30 in a step 840.

Finally, upon termination of the file name display in the step 840, the rack managing program 500 shown in FIG. 5 is resumed in a step 850.

As described previously, creation of the unused file case 112F can be realized by clicking the case houseroom 150 shown in FIG. 1 with the mouse. Similarly, creation of a new rack can be realized by clicking the rack houseroom 140 shown in FIG. 1 with the mouse.

In case the rack and the case become unnecessary, they can be housed again by dragging and dropping them in the respective houserooms 140 and 150.

Although it has been described above that after creation of the unused file case in the rack, the icon for the new file is dragged into the rack window with the mouse to place the icon on the unused file case, such arrangement can equally be adopted that upon dripping of the new file in the rack, the system prepares automatically an unused file case for registration.

Next, referring to FIG. 10 and FIGS. 11A, 11B and 11C, description will be directed to the contents of the processings executed by the latest version file adding program 1000 shown in FIG. 1.

Figure 10:
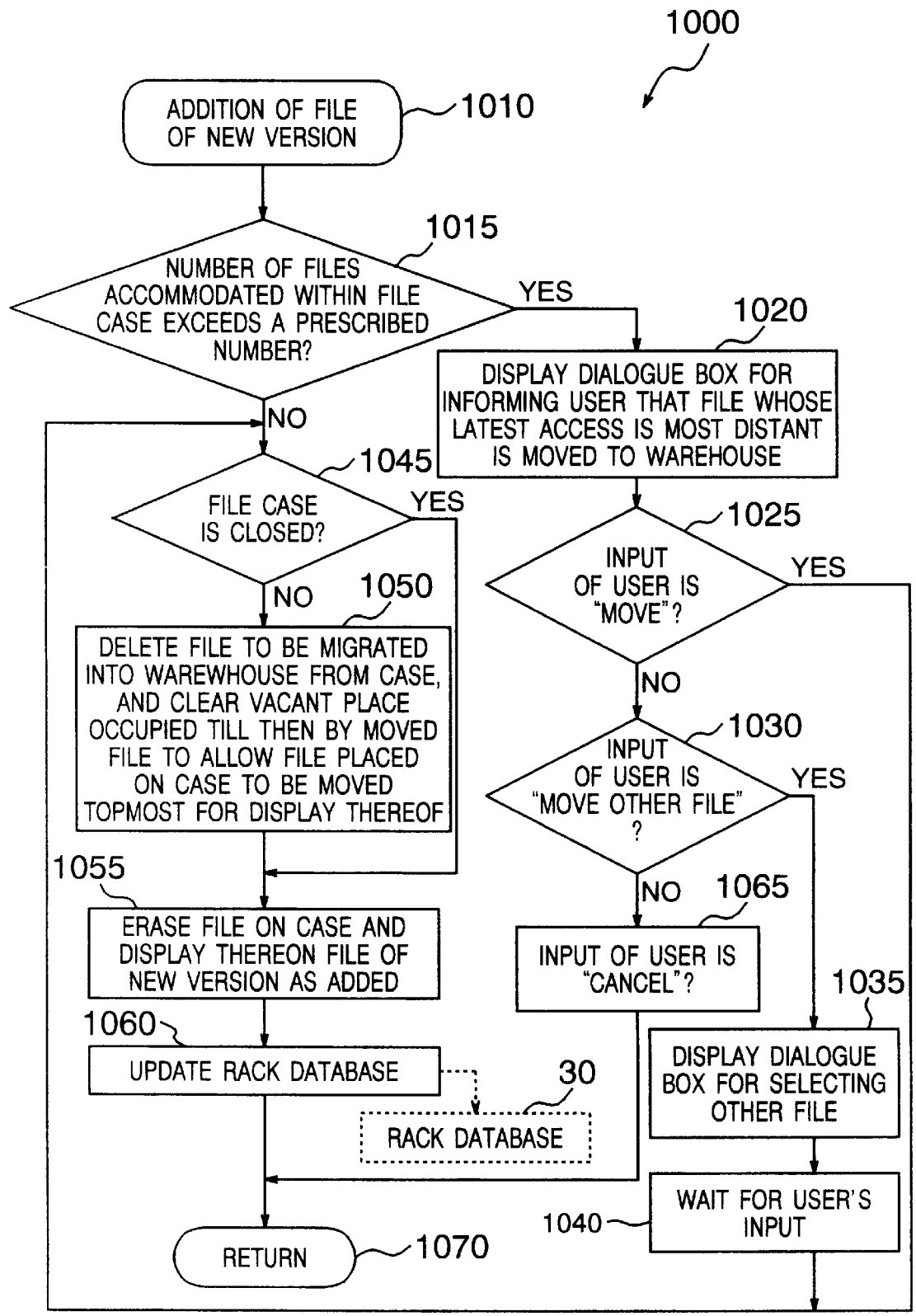
FIG. 10 is a flow chart for illustrating the contents of processings executed by a latest version file adding program employed in the version managing method according to an embodiment of the invention.

FIG. 10 is a flow chart for illustrating the contents of processings executed by the latest version file adding program employed in the version managing method according to the instant embodiment of the invention, and FIGS. 11A, 11B and 11C are views showing a file case and windows generated on the display screen for illustrating the contents of processings executed by the latest version file adding program employed in the version managing method according to the instant embodiment of the invention.

Referring to FIG. 10, when the user adds a file of a new version (equivalent to the latest version), the CPU 10 activates the latest version file adding program 1000 in a step 1010. In case the new version file is destined for catalog or magazine available commercially, addition of the new version file can be realized by installing a new file. Besides, addition of such new version file is also performed for updating the user's file in accordance with the file update managing program 1700, which will be described later on.

In a step 1015, the CPU 10 makes decision whether or not the number of the files accommodated within the file case 112 exceeds a prescribed number. In the case of the instant embodiment of the invention, an upper limit is imposed on the number of files capable of being stored in the file case 112. The files overflowing from the file case are moved to a warehouse. Thus, in the step 1015, the number of the files contained within the file case 112 is checked.

At first, description will be made on the presumption that the number of the files contained in the file case 112 exceeds a certain prescribed number. Among the file cases, there make appearance those which can no more store any further file because of increase of the files of the file group 117 for the back numbers, as shown in FIG. 11A. In the file case 112 shown in FIG. 11A, a maximum number of files have been housed and arrayed in the chronographical order in which the files were accessed or used, starting from the file used latest, e.g. in the sequential order of Vol. 5, Vol. 3, Vol. 4, Vol. 2 and Vol. 1.

When the number of the files to be stored in a given one of the file case exceeds the prescribed number mentioned above, a dialogue box is displayed to inform the user that the file whose latest accessed date is most distant in the past is moved to the warehouse. FIG. 11B shows an example of such dialogue box displayed within a migration-to-warehouse confirming window W30. Referring to FIG. 11B, there are displayed within the migration-to-warehouse confirming window W30 a message "Hitachi catalog Vol. 1 not accessed recently can be moved to warehouse for allowing Hitachi catalog Vol. 6 to be added ?" together with three different buttons "Move", "Cancel" and "Move other file".

In a step 1025, decision is made as to whether the input of the user is "Move" or not. When the user's answer is that the file indicated by the system is to be moved to the warehouse, the processing for moving the file to the warehouse is executed in the step 1045 et seq., whereon processing for adding the new version file is carried out.

In a step 1030, decision is made as to whether the input of the user is "Move other file" or not. In case the user's answer is "Move other file", the processing proceeds to a step 1035, whereon after execution of a step 1040, the processing for adding the new version file is executed after the file migration to the warehouse as executed in the step 1045 et seq.

Now, description will turn to the processing executed when the user's response is "Move other file". When the user selects the prompting "Move other file", a dialogue box for allowing the user to select other file is displayed in the 1035. FIG. 11C shows an example of such dialogue box displayed within a window W40. As can be seen in FIG. 11C, there are displayed within the window 40 "Hitachi Catalog Vol. 5" to "Hitachi Catalog Vol. 1" together with file creation/update dates and the accessed dates. Thus, the user can select the file to be moved to the warehouse on the basis of these displayed data.

In the step 1040, the user's selection of the file is waited for. Thereafter, the file designated by the user is migrated to the warehouse, whereupon the processing for adding the new version file is executed in the step 1045 et seq.

Now, description will turn to the processing executed in the steps 1045 et seq. Parenthetically, the step 1045 is also executed when the decision step 1015 results in negation "NO" (i.e., when the number of files accommodated within the file case does not exceed the prescribed number mentioned previously).

In the step 1045, decision is made as to whether the file case is displayed in the open state or in the closed state. When the file case is closed, the processing proceeds to a step 1055. On the other hand, when the file case is opened, a processing step 1050 is executed because of necessity of changing display of the file group of the back numbers housed within the file case.

In the step 1050, in case there is a file to be migrated into the warehouse, that file is deleted from the case, whereon the vacant place occupied till then by the migrated file is cleared for thereby allowing the file placed on the case to be moved to the topmost location of the file for display thereof.

Subsequently, in a step 1055, the file being displayed at the file-case door on the file case is erased. Additionally, the file of new version as added is displayed on the file case.

Furthermore, in a step 1060, the data registered in the rack database 30 are updated.

Finally, upon termination of updating of the rack database in the step 1060, return is made to the rack managing program 500 shown in FIG. 5 in a step 1070. Similarly, when the user clicks the button "Cancel" in a step 1065, the processing for adding the file of new version is terminated, whereupon the processing returns to the rack managing program 500.

In case the number of file groups of the back numbers increases, that of the files not used frequently will increases as well. In that case, accommodation of all the files within the associated file case provides obstacle to the access to desired one of the files as accommodated. For this reason, according to the teachings of the invention incarnated in the instant embodiment, limitation is imposed on the number of files which can be accommodated within the file case 112, wherein upon addition of a new file to the file case 112, a file within the file case 112 which becomes full of files is migrated to a warehouse 72. Further, the file as used is automatically moved to the topmost position of the file case after the use.

Figure 12:
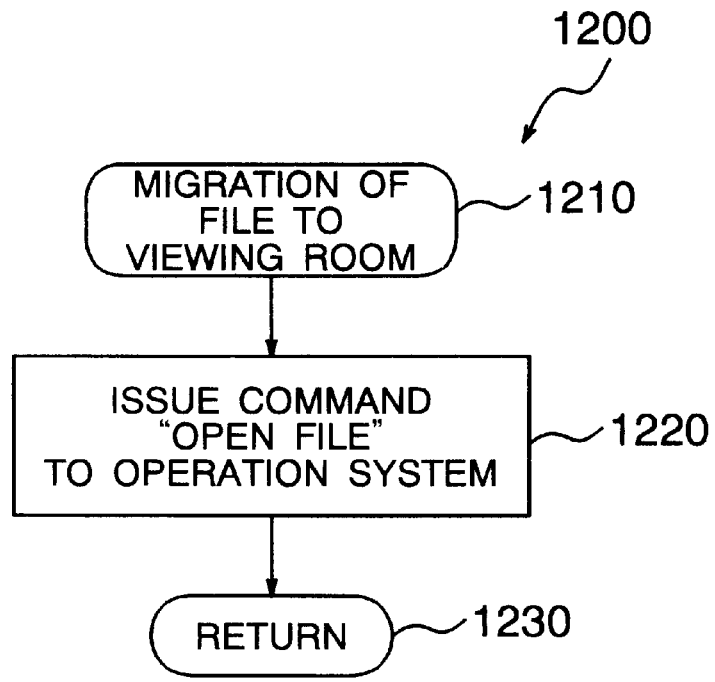
FIG. 12 is a flow chart for illustrating the contents of processing executed by a file opening program employed in the version managing method according to an embodiment of the invention.
Figure 13:
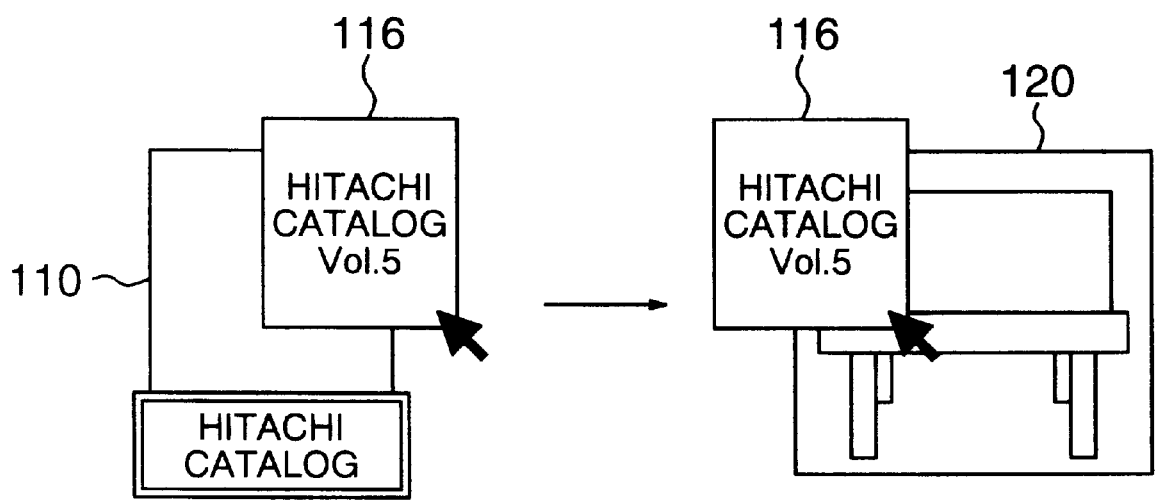
FIG. 13 is a view showing a rack and a viewing room generated on a display screen for illustrating the contents of processings executed by the file opening program used in the version managing method according to an embodiment of the invention.

Next, referring to FIGS. 12 and 13, description will turn to the contents of the processings executed by the file opening program 1200 shown in FIG. 1.

FIG. 12 is a flow chart for illustrating the contents of processings executed by the file opening program employed in the version managing method according to the instant embodiment of the invention, and FIG. 13 is a view showing, by way of example, a rack and a viewing room generated on the display screen for illustrating the contents of processings of the file opening program used in the version managing method according to the instant embodiment of the invention.

Ordinarily, opening of a given file is realized by clicking twice an icon representing the file. However, double click is a troublesome operation for those who are not accustomed to manipulate the mouse. Accordingly, in the version managing system now under consideration, a viewing room 120 is provided in juxtaposition to the rack 110, as can be seen in FIG. 1, so that operation for opening the file is carried out automatically by the system when the file is moved into the viewing room 120 through the system.

More specifically, when the user performs manipulation for migrating a file 116 to be opened to a viewing room 120, as shown in FIG. 13, the CPU 10 activates the file opening program 1200 in a step 1210 shown in FIG. 12.

In a step 1220, the CPU 10 issues a command "open file" to the operation system.

Finally, at the end of operation for sending the command in the step 1220, the processing returns to the rack managing program 500 shown in FIG. 5 in a step 1230.

Figure 14:
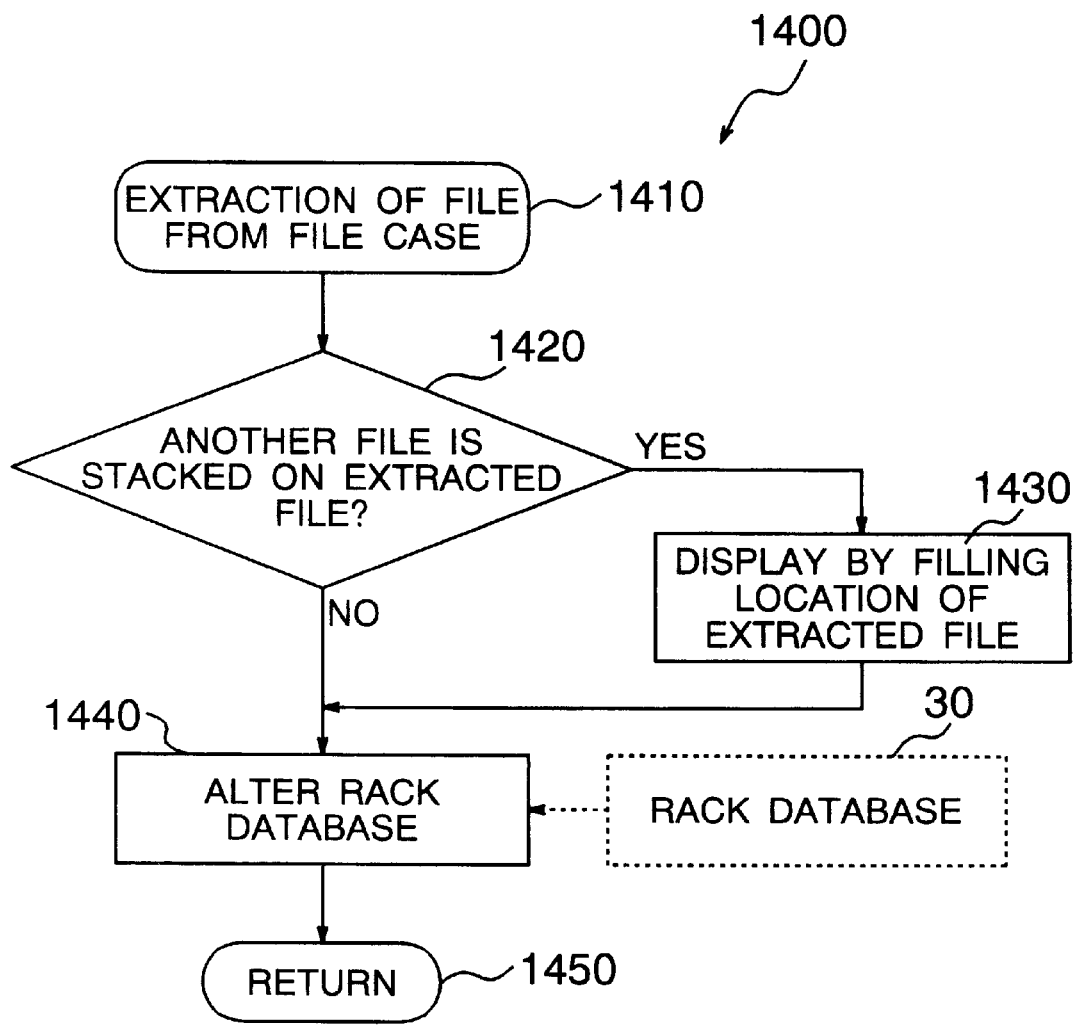
FIG. 14 is a flow chart for illustrating the contents of processing executed by a case internal files restacking program employed in the version managing method according to an embodiment of the present invention.
Figure 15:
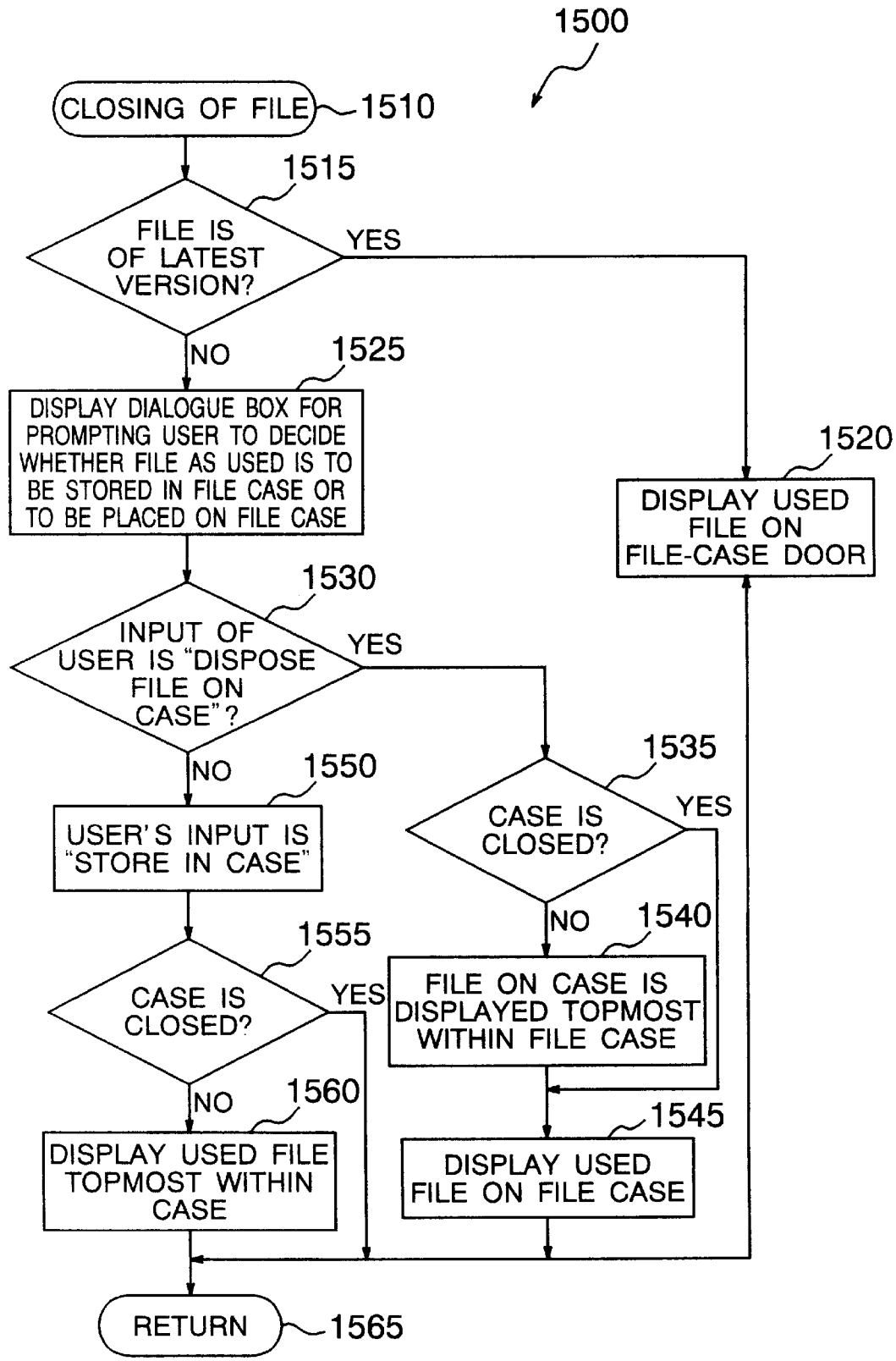
FIG. 15 is a flow chart for illustrating the contents of processings executed by a latest accessed file displaying program employed in the version managing method according to an embodiment of the invention.

Next, referring to FIGS. 14, 15 and 16, description will be directed to the contents of the processings executed by the case internal files restacking program 1400 and the latest accessed file displaying program 1500 shown in FIG. 1.

Figure 16A:
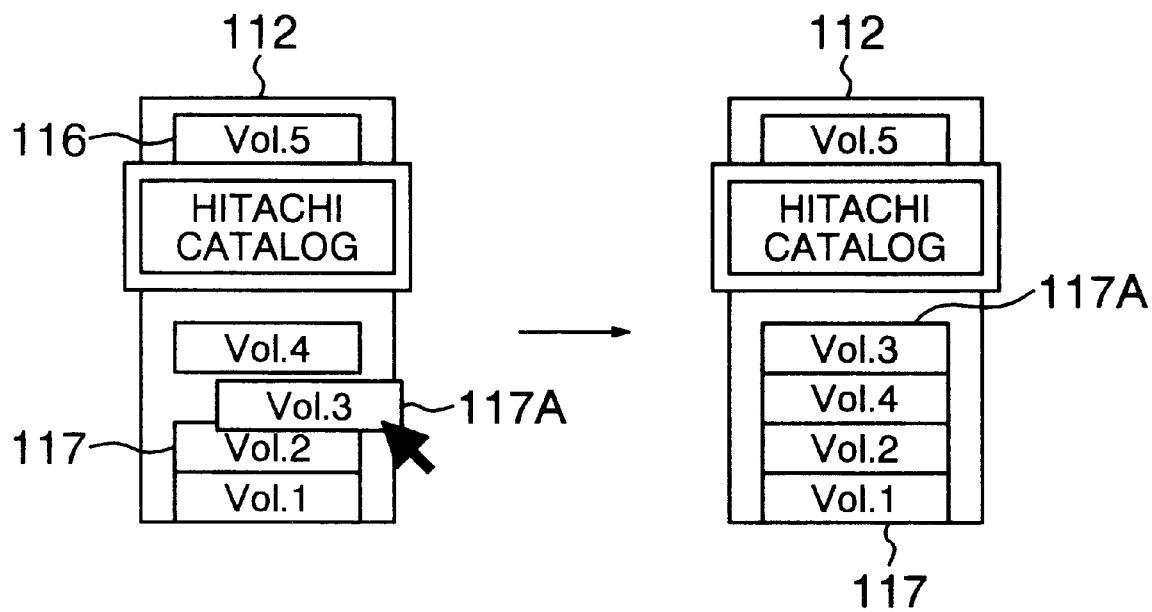
FIGS. 16A and 16B are views showing file cases and a confirming window generated on a display screen for illustrating the contents of processings executed by the case internal files restacking program and the latest-accessed file displaying program used in the version managing method according to an embodiment of the invention.
Figure 16B:
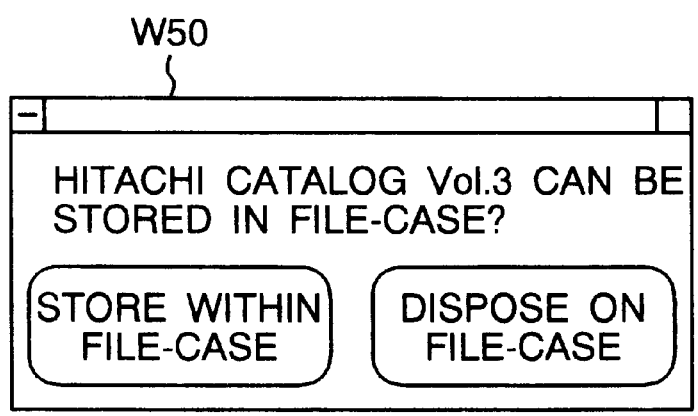

FIG. 14 is a flow chart for illustrating the contents of processings executed by the case internal files restacking program employed in the version managing method according to the instant embodiment of the invention, FIG. 15 is a flow chart for illustrating the contents of processings executed by the latest-accessed file displaying program employed in the version managing method according to the instant embodiment of the invention, and FIGS. 16A and 16B are views showing file cases and a confirming window generated on the display screen for illustrating the contents of processings of the case internal files restacking program and the latest accessed file displaying program used in the version managing method according to the instant embodiment of the invention.

Now, it is supposed that there are stored in the file cases the latest file (file of the latest version) 116 and the files of the file group 117 including a plurality of back numbers, as shown in FIG. 16A. Displayed in association with the file group 117 for the back numbers are the access dates of the files, being arrayed in the sequential order, starting from the latest access date, as described hereinbefore in conjunction with the rack database 30 by reference to FIG. 4. More specifically, the files "Hitachi Catalog" are arrayed in the sequential order of Vol. 4, Vol. 3, Vol. 2 and Vol. 1 from the top. This means that the "Hitachi Catalog" of Vol. 4 was accessed latest with the "Hitachi Catalog" of Vol. 3 being accessed earlier than the Vol. 4, and so forth.

At this juncture, it should be mentioned that different file display processings are executed for the situation where the file stacked at the topmost position is to be taken out or dragged and for the situation where the file stacked at intermediate position is to be taken out, respectively. Accordingly, the file display processing has to be changed in dependence on the situations mentioned above. To this end, the case internal files restacking program is executed.

Referring to FIG. 14, the CPU 10 activates the case internal files restacking program 1400 in a step 1410 when a file within the file case is picked out.

Subsequently, it is decided whether another file is stacked on the file picked out in a step 1420.

When another file is stacked on the file picked out or extracted, contents of the display being generated is altered such that the location which has been occupied till then by the extracted file and which is now vacant is filled with other file in a step 1430.

Furthermore, the version names 33 in the rack database 30 as well as the sequential orders of the entries in the remark column 34 and the link-destination file name 35 are rearrayed correspondingly in a step 1440.

Finally, upon completion of alteration of the rack database has in the step 1440, return is made to the rack managing program 500 shown in FIG. 5 in a step 1450.

Next, referring to FIG. 15, description will be directed to the processing when the file as extracted is to be closed.

As shown in FIG. 16A, a file 117A for "Hitachi Catalog" of "Vol. 3" as taken out from the file group 117 for the back numbers is closed and stored in the rack after the use thereof. In that case, "Hitachi Catalog" of "Vol. 3" is displayed topmost within the file case 112, being followed by displays of Vol. 4, Vol. 2 and Vol. 1 in this order. This procedure resembles a situation in the everyday life where a book is taken out from a stack of books and placed topmost after the use. At this juncture, it is presumed in the foregoing description that new file is always displayed on the file-case door 113. However, there may equally be conceivable a method of displaying on the file-case door 113 the latest accessed one in a series of files. For this reason, a dialogue box such as shown in FIG. 16B is displayed to allow the user to determine which of the files mentioned above is to be displayed on the file-case door 113 in the instant program. By moving the used file to the topmost position within the file case every time the file is used, position of the file in the file stack provides a measure or guidepost for the frequency at which the file has been accessed.

Next, referring to the flow chart illustrated in FIG. 15, description will be made of the processings of the latest accessed file displaying program 1500.

When the file as used is closed, the CPU 10 activates the latest accessed file displaying program 1500 in a step 1510.

At first, it is decided in a step 1515 whether or not the used file is of the latest version. When this decision step results in affirmation or "YES", the used file of the latest version is displayed on the file-case door. More specifically, in the state shown in FIG. 16A, when the file 116 of the latest version is used, it may be returned onto the file case 112 which is the original position of the file 116 of the latest version. Subsequently, in a step 1565, return is made to the rack managing program 500 shown in FIG. 5.

Unless the used file is of the latest version, a dialogue box is displayed in a step 1525 for prompting the user to decide whether the file as used is to be stored in the file case or to be disposed on the file case. FIG. 16B shows a confirming window W50 in which the dialogue box generated in the step 1525 is displayed. As can be seen in FIG. 113, there are displayed within the dialogue box a message ""Hitachi Catalog Vol. 3" can be stored in file case ?" together with buttons "Store in file case" and "Dispose on file case".

Subsequently, in a step 1530, decision is made as to whether the input of the user is "Dispose on file case" or not. When "Dispose on file case" is inputted, processing proceeds to a step 1535.

When the user selects "Dispose on file case", it is then decided in a step 1535 whether or not the file case is closed. When the file case is closed, the processing proceeds to a step 1545. On the other hand, when the case is opened, the file of the latest version disposed currently on the file-case door is displayed at the topmost portion within the file case in the step 1540.

Next, in a step 1545, the used file is displayed on the file-case door, whereupon processing returns to the rack managing program 500 shown in FIG. 5 in the step 1565.

When the user selects the block "Store in file case" in the step 1550, it is decided in a step 1555 whether the file case is opened or closed. When the file case is closed, the processing proceeds to a step 1565 and otherwise to a step 1560 where the used file is displayed at the topmost position or location within the file case, which is then followed by the step 1565 to resume the rack managing program 500 shown in FIG. 5.

Figure 17:
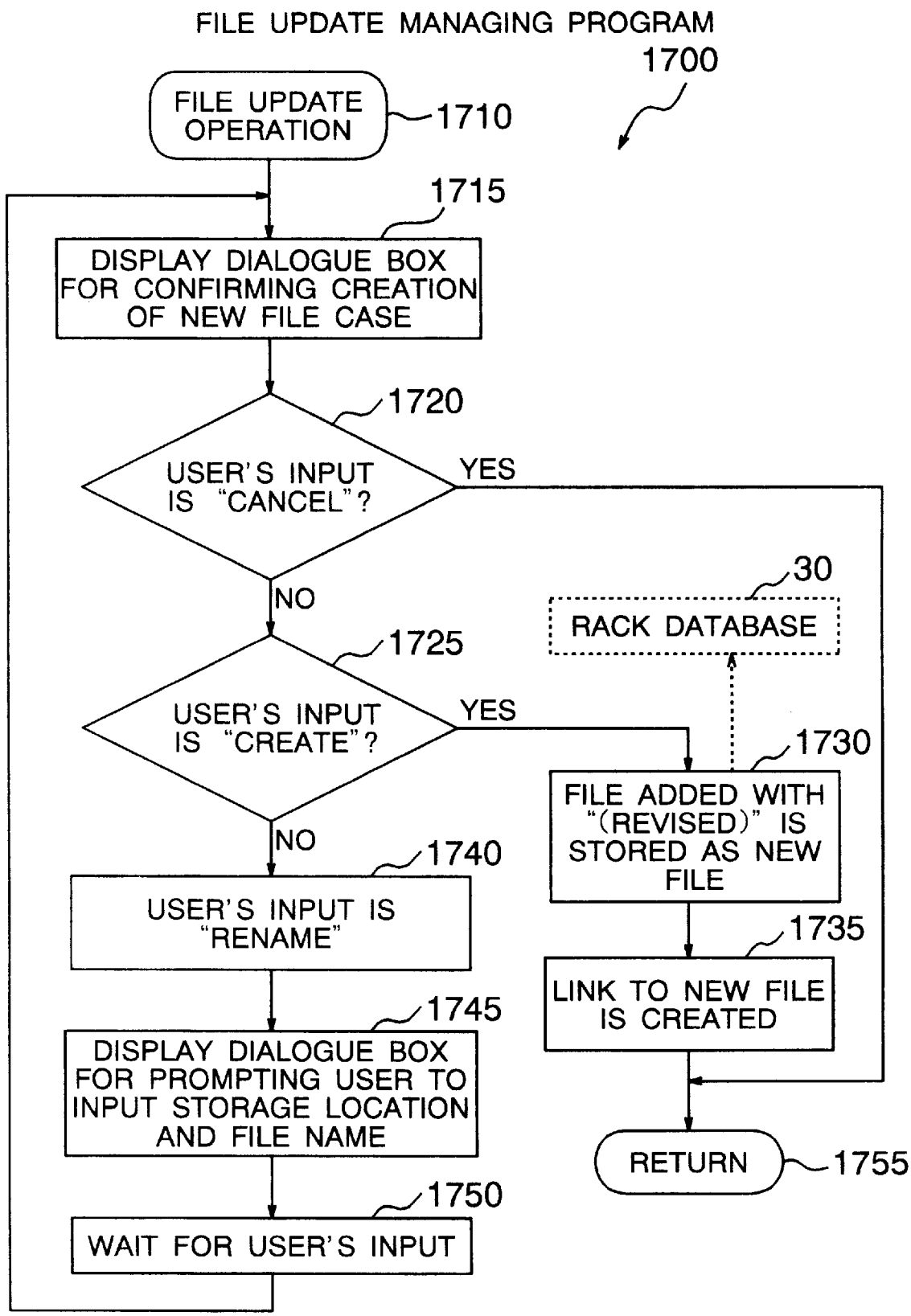
FIG. 17 is a flow chart for illustrating the contents of processing executed by a file update managing program employed in the version managing method according to an embodiment of the invention.

Next, referring to FIG. 17 together with FIGS. 18A to 18D, description will be directed to the contents of the processings executed by the file update managing program 1700 shown in FIG. 1.

FIG. 17 is a flow chart for illustrating the contents of processings executed by the file update managing program employed in the version managing method according to the instant embodiment of the invention, and FIGS. 18A to 18D are views showing file cases and a window generated on the display screen for illustrating the contents of processings of the file update managing program used in the version managing method according to the instant embodiment of the invention.

Let's suppose that a new file is to be created by modifying "Hitachi Catalog Vol. 3". In that case, difficulty will be encountered in managing the newly created file as the file differing in the version from the version "Vol. 3" and other files. Under the circumstances, according to the teaching of the invention incarnated in the instant embodiment, recommendation is made to the user that a new file case should be created for the modified file, and when the user accepts the recommendation, there is created as a new file case, e.g. "Hitachi Catalog 2".

When the user performs file update operation, the CPU 10 activates the file update managing program 1700 in a step 1710 shown in FIG. 17.

Figure 18A:
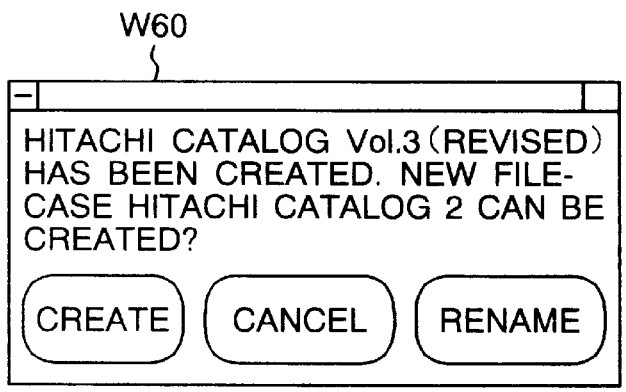
FIGS. 18A to 18D are views showing file cases and a window generated on a display screen for illustrating the contents of processings executed by the file update managing program used in the version managing method according to an embodiment of the invention.

In a step 1715, a dialogue box for confirming creation of a new file case is displayed. FIG. 18A shows an example of such confirming dialogue box displayed within a file-case creation confirming window W60. As can be seen in FIG. 18A, there are displayed within the confirming dialogue box a message "Hitachi Catalog Vol. 3 (revised) has been created. New file case ""Hitachi Catalog 2" be created ?" together with buttons "create", "Cancel" and "Rename".

In a step 1720, decision is made as to whether the input of the user is "Cancel" or not. When "Cancel" is inputted from the user, the processing returns to the rack managing program 500 shown in FIG. 5 in a step 1755.

Figure 18B:
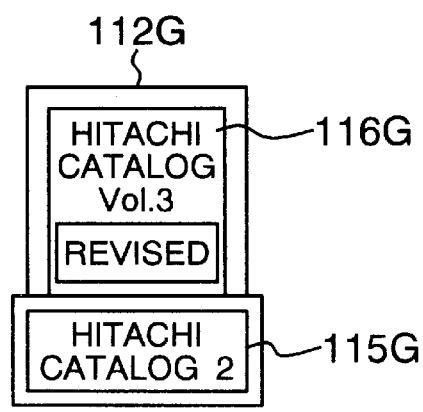

In a step 1725, decision is made as to whether the input of the user is "Create" or not. When "Create" is inputted, the file name is added with "(revised)". Then, the file added with "(revised)" is stored as a new file in the rack database 30 in a step 1730. As a result of this, a file case 112G labeled "Hitachi Catalog 2" as the file-case name 115G is created, whereon a file-case name 115G "Hitachi Catalog Vol. 3 (revised)" is displayed on the file-case door of the file case 112G as a file 116G of the latest version, as can be seen in FIG. 18B.

Figure 18C:
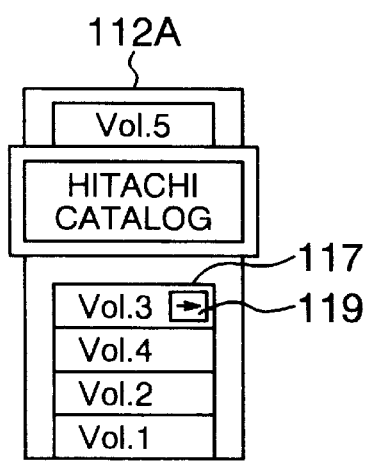
Figure 18D:
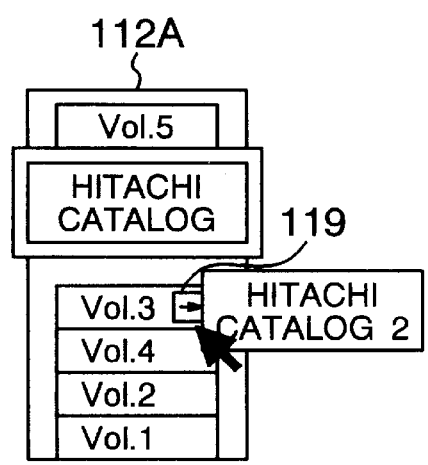

In addition, a link to the new file is created in a step 1735. More specifically, a link icon 119 is displayed at the file "Vol. 3" in the file group 117 for the back numbers stored in the file case 112A in which the original of the new file was stored, as shown in FIG. 18C. Thus, by clicking the link icon 119 with the mouse, the file case "Hitachi Catalog 2" for the derived file is displayed, as is illustrated in FIG. 18D. In a step 1755, the processing returns to the rack managing program 500 shown in FIG. 5.

When the input of the user in the step 1740 is "Rename", a dialogue box for prompting the user to input the store location and the file name is displayed in a step 1745. Although this dialogue box is omitted from illustration, a message prompting the user to input the file storage location and the file name is displayed.

In a step 1750, the user's input is awaited. Subsequently, the step 1715 is resumed in order to execute succeeding processings.

At this juncture, it should be mentioned that creation of a new file may include creation of a unitary file from a plurality of files. In that case, inter-file relations can be held by affixing links to the unitary file from the plural files, respectively.

Although only one link is displayed in the case of the illustrated example, it is self-explanatory that a plurality of links can be set by writing the corresponding number of link destinations in the link-destination file name column 35 of the rack database 30.

Next, referring to FIGS. 19A and 19B, description will be made of detailed information.

Figure 19A:
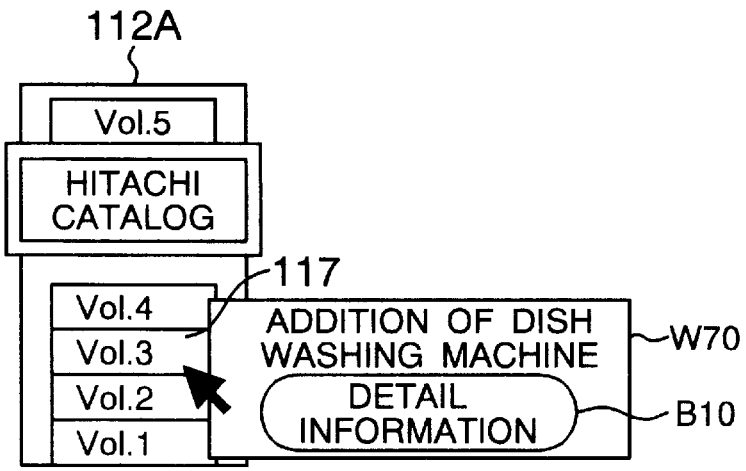
FIGS. 19A and 19B are views showing a file case and a window generated on a display screen for illustrating detailed information used in the version managing method according to an embodiment of the invention.
Figure 19B:
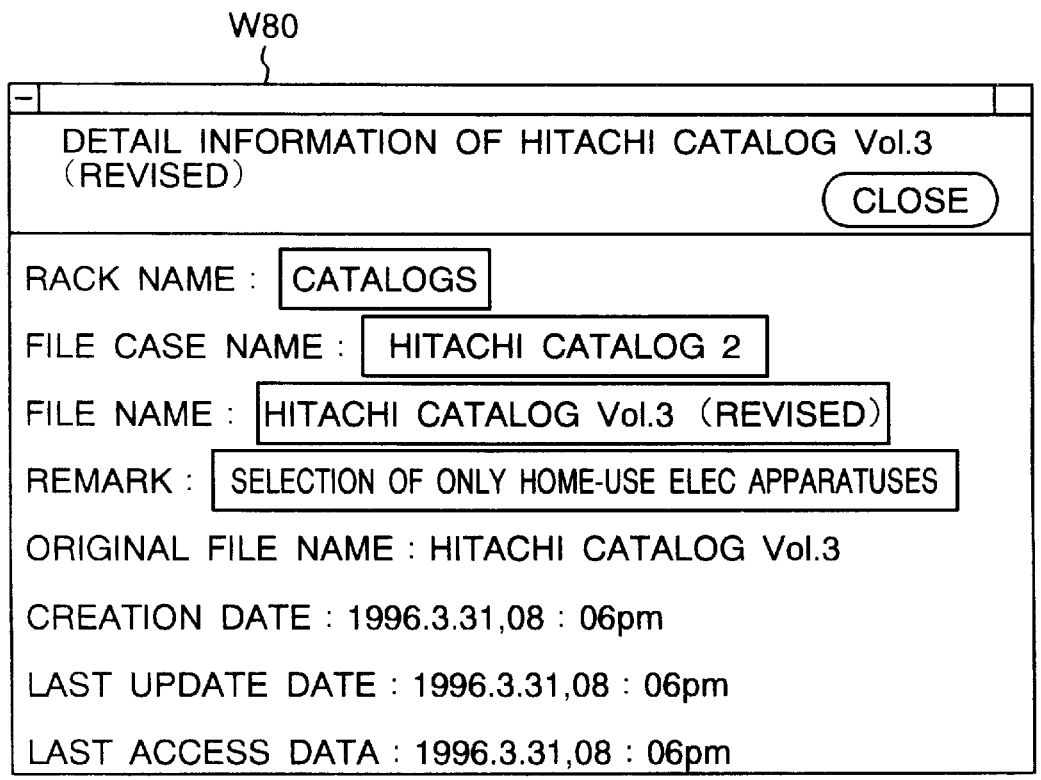

FIGS. 19A and 19B are views showing a file case and a window generated on the display screen for illustrating the detailed information used in the version managing method according to the instant embodiment of the invention.

When the data structure of the rack database 30 is such as described hereinbefore by reference to FIG. 4, brief comment on the content of the file labeled the version name 33 of "Vol. 3" is entered in the remark column 34. Besides, the file name is entered in the link-destination file name column 35.

Thus, in the version managing system according to the instant embodiment of the invention, when e.g. "Vol. 3" is clicked in the file group 117 for the back numbers stored in the file case 112A, there is displayed a remark displaying window W70, as shown in FIG. 19A. Displayed in this remark displaying window W70 is remark or comment about the content of the file having an entry in the remark column 34. In this conjunction, it is noted that difference in the contents among the files of different versions is often incapable of being distinctively determined only from the file name and the version name. However, troublesome procedure will be involved for confirming the contents of the individual files by opening them from one to another. Accordingly, it is also taught according to the invention incarnated in the instant embodiment that the comment on the content of the file is entered so that identification of a desired file can be facilitated through overview of the remarks in selecting a desired file.

Furthermore, a detailed information displaying button B10 is clicked with the mouse, a details displaying window W80 is displayed.

Thus, by clicking the link icon 119 with the mouse, the file case "Hitachi Catalog 2" for the derived file is displayed, as can be seen in FIG. 18D. Additionally, by clicking "Hitachi Catalog 2", it is possible to display the remark displaying window W70 and the detailed information displaying button B10, as described hereinbefore by reference to FIG. 19A.

FIG. 19B is a view showing an example of the details displaying window W80 which is displayed by clicking the detailed information displaying button B10 within the remark displaying window W70 for "Hitachi Catalog 2". As can be seen in the figure, there are displayed within the details displaying window 80 a title "Detailed information concerning Hitachi Catalog Vol. 3 (revised)" together with blocks "Rack name", "Case name", "File name", "Remark" and "Name of original file" and the like.

The original file from which the derived file has been generated can be identified by checking "File name" contained in the details displaying window W80. Furthermore, edition of the content of "Remark" such as correction thereof or the like can be performed with the aid of the details displaying window W80. The content of "Remark" resulting from the edition can be entered in the remark column 34 of the rack database 30.

Next, referring to FIGS. 20 and 21, description will be directed to the contents of the processings executed by the file search program 2000 shown in FIG. 1.

FIG. 20 is a flow chart for illustrating the contents of processings executed by the file search program employed in the version managing method according to the instant embodiment of the invention, and FIG. 21 is a view showing exemplarily a file search window generated on the display screen for illustrating the contents of processings of the file search program employed in the version managing method according to the instant t embodiment of the invention.

The version managing system according to the instant embodiment of the invention is imparted with a representative file search function for restricting the range of file search to representative files in addition to a conventional file search function for retrieving all the files. At this juncture, it is contemplated with the phrase "Representative File" to mean a file group composed of the files arrayed on a plurality of file cases of a rack. In the conventional file search, a series of files of different versions are dealt with as the separate files. Consequently, the result of the search may contain a large number of files having similar names, which provides such inconvenience that lots of time and/or troublesome procedure is required for finding out a file of concern and that a series of files of different versions can not be searched en bloc.

In response to the input of the file search by the user, the CPU 10 activates the file search program 2000 in a step 2010 shown in FIG. 20.

Now, in a step 2015, the file search window is displayed. FIG. 21 shows an example of such file search window 90 displayed by executing the processing in the step 2015. According to the invention incarnated in the instant embodiment, it is taught to limit the range of search to the representative files with a view to reduce the time taken for the search when compared with the method of searching all the files while mitigating the burden imposed on the user for the file search. In the file search window W90, there are provided an input column for "File name for search" and a column for designating "Search range". In the column for designating the range of search, buttons "All File search" and "Representative File search" are displayed to make it possible for the user to select the all-file search or the representative-file search. Besides, the user can input data concerning the rack name, the creation date and the access date. Additionally, buttons "Execute" and "Close" are displayed at upper right locations in the file search window W90.

In a step 2020, the conditions for searching a file of concern are inputted by the user, whereon the user is prompted to click the button "Execute" or "Close". When it is decided in a step 2025 that the button "Close" is pushed or clicked (i.e., when the decision step 2025 is affirmative "YES"), the file search window W90 is closed in a step 2030, being followed by a step 2035 where the processing returns to the rack managing program 500 shown in FIG. 5.

On the other hand, unless the "Close" button is clicked (i.e., when the decision in the step 2025 results in the negative "NO"), it is then decided in a step 2040 that the button "Execute" is clicked, whereupon the user is prompted to select either "All Files" or "Representative File" search as the search range in a step 2045.

When it is decided in a step 2055 that when the representative-file search has been selected in the step 2045 (i.e., "YES"), the files having the leading version names in the file groups each including files allocated with the same name in the rack database 30 shown in FIG. 4 are set as the files to be subjected to the search processing (hereinafter, these files will be referred to as the search-subjected files). By way of example, in the case of the example shown in FIG. 4, the files having such version name as "Vol. 5" in the files "Hitachi Catalog" or version name "Summer, '96," in the files "BB Wear" and so forth are subjected to the search processing.

When the button "All Files" is clicked in the step 2045, all the files are subjected to the search in the step 2055. In the case of the example shown in FIG. 4, the files having the version names "Vol. 5" to "Vol. 1" in the file group "Hitachi Catalog", the files having the version names "Summer Issue, '96" and so forth in the file group "BB Wear", the files having the version names "Plan 6", "Plan 5" and so forth in the file group "Manufacture Plan" are all subjected to the search.

Next, in a step 2060, file search is performed for the search-subjected files, the result of which is displayed in the file search window W90 in a step 2065. An example of the result of the search as displayed within the file search window W90 is shown in FIG. 21. In the case of the example now under consideration, the files having the file name "Catalog" have been retrieved from the representative files. More specifically, it is shown that the catalogs "Hitachi Catalog Vol. 5" and "H & H Catalog" have been hit.

Subsequently, the processing returns to the step 2020 where the input by the user is waited for. When it is decided in the step 2025 that the button "Close" is clicked (i.e., when the decision step 2025 is affirmative "YES"), the file search window W90 is closed in the step 2030, being followed by the step 2035 where the processing returns to the rack managing program 500 shown in FIG. 5.

Next, referring to FIGS. 22A and 22B and FIGS. 23A and 23B, description will be made the warehouse in the version managing system according to the instant embodiment of the invention.

Figures 22A, 22B:
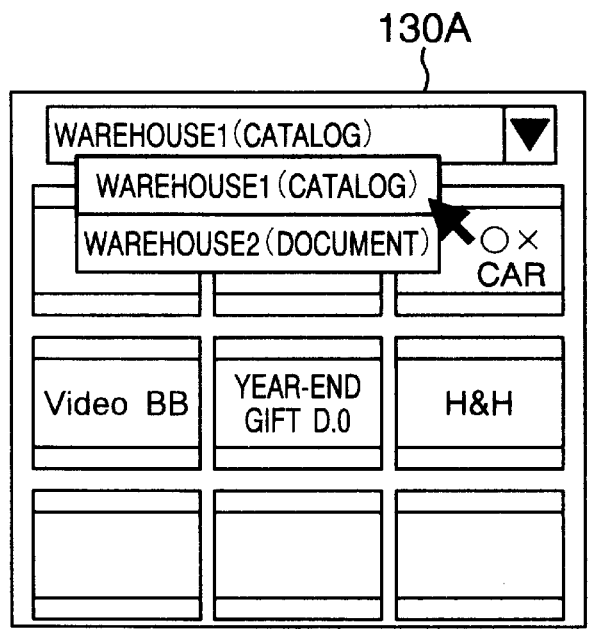
FIGS. 22A and 22B are views showing windows generated on a display screen for illustrating a warehouse used in the version managing system according to an embodiment of the invention.
Figures 23A, 23B:
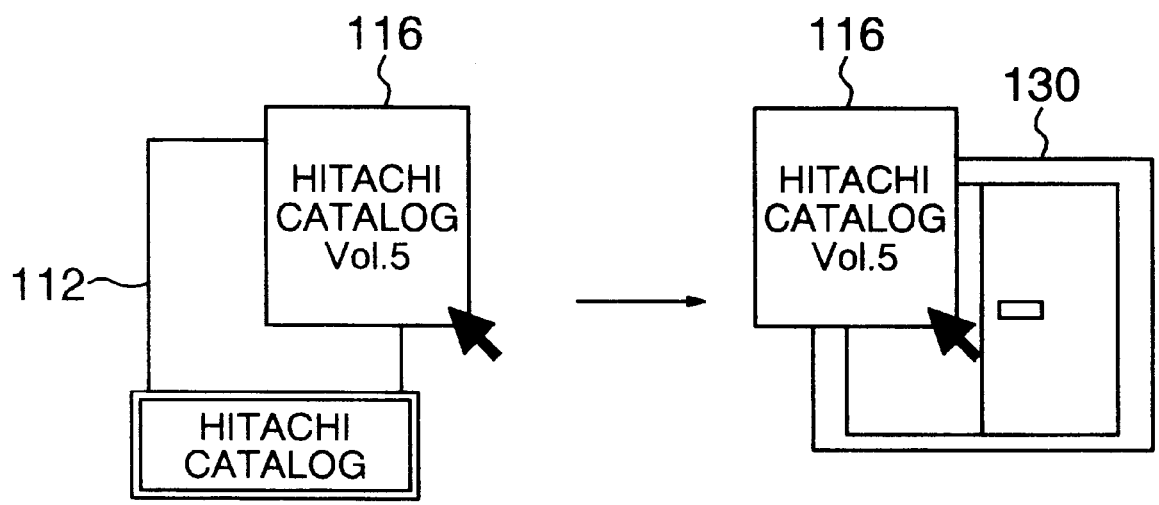
FIGS. 23A and 23B are views showing windows for illustrating how to use the warehouse in carrying out the version managing method according to an embodiment of the invention.

FIGS. 22A and 22B are views showing windows generated on .the display screen for illustrating the warehouse used in the version managing system according to the instant embodiment of the invention and FIGS. 23A and 23B are views showing windows for illustrating how the warehouses are used in carrying out the version managing method according to the instant embodiment of the invention.

When the warehouse 130 shown in FIG. 1 is clicked with the mouse, warehouses 130A are displayed in such a manner as illustrated in FIG. 22A, in which the warehouses as shown are provided in correspondence to the racks 110, 110A, 110B and 110C shown in FIG. 2, respectively. More specifically, the warehouse 1 serves for accommodating "Catalogs" on the rack 110, while the warehouse 2 is for "Documents" on the rack 110A. Although there are provided a warehouse for "Games" and a warehouse for "Albums", they are omitted from illustration. Assuming now that "Warehouse 1 (Catalog)" is displayed, as can be seen in FIG. 22A.

Within the warehouse 130A, there are provided cardboard boxes in correspondence to the file names, respectively. A series of files having a same file name are contained in a same cardboard box. By clicking a cardboard box, a list of files contained therein is displayed.

FIG. 22B is a view showing, by way of example, a warehouse details displaying window W100 generated on the display screen when "Hitachi Catalog" stored in the warehouse 1 shown in FIG. 22A is clicked. Data of the warehouse 130 are stored in the rack database 30 for management on a file-name basis similarly to the file data. In the case of the example illustrated, catalogs "Hitachi Catalog Vol. 6, 1995" to "Hitachi Catalog Vol. 1, 1995" are contained in the cardboard box labeled "Hitachi Catalog" within the warehouse "Warehouse 1 (Catalog)".

Description will now be made of a method of stocking the files rendered unnecessary within the warehouse by reference to FIGS. 23A and 23B.

For migrating a file to be housed within the warehouse from the file case 112, the user may drag and drop the file in the warehouse. By way of example, the file 116 of the latest version can be migrated into the warehouse 130 by drag and drop operation with the mouse. Further, when a given one of the files belonging to a file group of back numbers is to be migrated to the warehouse, the relevant file case is opened by clicking the file-case knob thereof with the mouse, whereon the given file in the opened file case is moved to the warehouse 130 by the drag-and-drop operation. As will be appreciated, for migration of a file into the warehouse, the user is required only to throw the file into the warehouse 130. Storage of the file in the cardboard box is automatically realized by the CPU 10 on the basis of the file name and the original state of the file in the rack database.

When there makes appearance the cardboard box of excessively large size or the cardboard box not accessed over a predetermined time span, the system may inquire the user as to whether the cardboard box should be compressed or not. When user's input is affirmative, the file is compressed semi-automatically.

Thus, there can be realized the version managing method as well as the version managing system which facilitates the access to the files used frequently in a semi-automated manner and thus can mitigate the burden imposed on the user in managing the files by virtue of the features that the number of the files to be displayed within the file case is determined previously, the file accessed is stored topmost line within the file case 112 with the other files being stored internally or deeply within the file case while older files are semi-automatically migrated into the warehouse as new files are added.

As will now be appreciated from the foregoing description, in the version managing method and the version managing system according to the instant embodiment of the invention disclosed herein, the concept "rack" for collecting catalogs has been adopted as metaphor in managing the versions of the files. The rack is constituted by a plurality of file cases juxtaposed to one another, wherein one file case is designed to accommodate a series of files of different versions. By virtue of such arrangement, the version management of the files can be much facilitated.

Further, because the latest file is placed on the door of the file case with the old files being housed deeply within the file case, the version of the file can be handled intuitively, which in turn contributes to reduction of the burden imposed on the user for the version management.

Owing to display of a cover of the latest file on the file case in the form of a contracted image, browsability of the files can be much enhanced.

Because the files are stacked within the relevant file cases in such order that the file accessed latest assumes a first storing position, the situation in which the files have been accessed lately can be grasped at sight.

Further, owing to such arrangement that when the number of files exceeds a predetermined number, the file accessed most distant in the past is migrated to the warehouse, burden imposed on the user for rearranging the files can be reduced, making it easy to access the file.

Thus, according to the teachings of the present invention, the file version management can be much facilitated, as a result of which the user can use lots of time for the intrinsic works to be executed by the personal computer.

According to the teachings of the present invention, file version management and rearrangement can be much simplified and facilitated.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, it is contemplated that the invention equally covers a computer-readable/executable program for processing a plurality of data stored in a storage unit and having data names and version names such that the plural data are classified into groups each including data having a same data name and different version names, a number of display areas corresponding to a number of the groups are generated on a display unit and that representative images which are associated with the groups, respectively, are displayed in corresponding display areas for thereby allowing given data belonging to any one of the groups to be executed when the representative image associated with the that one group is designated by user. Additionally, recording medium storing the program will fall within the purview of the invention.

Accordingly, all suitable modifications and equivalents may be resorted to, falling within the spirit and scope of the invention.

What is claimed is:

1. A version managing method for managing groups of files of different version by resorting to a system which includes storage means for storing data of groups of files of different versions, display means, and arithmetic processing means for performing processings by using the data stored in said storage means to thereby generate displays or said display means, said method comprising the steps of:
displaying on said display means a rack image including a plurality of file case areas;
displaying a file group image on a file group image display area of each of said file case areas, the file group being a group of files having a same file name and differing in respect to versions,
displaying a representative image on respective representative image display area of each of said file case areas, the representative image indicating a predetermined file included in said file group; and
when the file group is updated, changing and displaying said representative image by changing said predetermined file in response to the file group update.

2. A version managing method according to claim 1, wherein said version includes one selected from a group consisting of identifier number, issue number of electronic publications and date of creation.

3. A version managing method in accordance with claim 1, further comprising the steps of:
when the representative image is designated, displaying information indicating a content of the file corresponding to the representative image;
when the file group image is designated, displaying file images corresponding to the files included in the file group; and
when the file image is designated, displaying a content of the file corresponding to the file image.

4. A version managing method in accordance with claim 1, wherein said predetermined file is the newest file in said file group.

5. A version managing method in accordance with claim 1, wherein said representative image changing and displaying step is executed every time a new file is added to said file group and the step displays an image corresponding to the newly added file as a representative image.

6. A version managing system including a display unit and a processing unit,
wherein for a plurality of files stored in a storage unit, being classified groupwise, said processing unit sets on said display unit a number of display areas corresponding to a number of groups of said files, and
wherein said processing unit displays on said display unit a representative image which executes a predetermined file in the group in response to the designation of said display area; and
wherein when a content of the group is updated, said processing unit changes and displays said representative image by changing said predetermined file in response to the file group update.

7. A version managing system according to claim 6, said files having file names and version names, respectively,
wherein said group is a set of the files having a same file name and differing in respect to the version name.

8. A version managing system according to claim 6, wherein said file corresponding to said representative image contains latest data in respect to at least one of creation, use and storage in said storage unit in each of said groups.

9. A version managing system according to claim 6, wherein said representative image is a contracted image representing contents of the corresponding file.

10. A version managing system according to claim 6, wherein when said display area is designated, images corresponding to other files than said predetermined file in the file group corresponding to said designated display area are displayed in said display area.

11. A version managing system according to claim 10, wherein said images corresponding to said other files except for said predetermined file are displayed in said display area, being arrayed in a sequential order, starting from one newest in respect to at least one of date of access, date of creation, and date of storage in said storage unit.

12. A version managing system according to claim 10, wherein the number of the images displayed in said display area in correspondence to the other files than said predetermined file is limited to a predetermined number, and
wherein images of the other files lying outside of a range limited by said predetermined number are displayed when other display area is designated.

13. A version managing system according to claim 12,
wherein files lying outside of the range limited by said predetermined number are selected in a sequential order, starting from one oldest in respect to at least one of access date, creation date and date of storage in said storage unit in each of said file groups.

14. A version managing system according to claim 6,
wherein in searching a file, files corresponding to said representative images are subjected to search processing.

15. A version managing system according to claim 6,
wherein a file corresponding to said representative image is executed by moving said representative image to a predetermined area.

16. A version managing system according to claim 6,
when said display area is designated, said processing unit displays images of file in the group corresponding to said display area on said display unit;
when an image corresponding to the file is designated, said processing unit displays information indicating content of the file corresponding to the designated image.

17. A computer-readable/executable program for processing a plurality of data stored in a storage unit and having data names and version names, in the program executing the steps of:
classifying said said plural data into groups each including data having a same data name and different version names,
preparing a number of display areas corresponding to a number of the groups on a display unit;
displaying a representative image, which executes a predetermined file in each group on said display area;
displaying a representative image, which executes a predetermined file in each group on said display area;
when a content of the group is undated, changing and displaying said representative image on said displaying unit by changing said predetermined file in response to the file group update.

18. A computer-readable/executable program according to claim 17, the program further executing the steps of:
displaying a group image of the files in the group corresponding to said display area;
when said group image is designated, displaying a file image corresponding to each file included in said group; and
when said file image is designated, displaying information indicating a content of the file corresponding to the file image.

19. A computer-readable/executable program according to claim 17, wherein said predetermined file is the newest file in said group.

20. A computer-readable/executable program according to claim 17,
wherein said representative image changing and displaying step is executed every time a new file is added to said group and the step displays an image corresponding to the newly added file as a representative image.

* * * * *